(12) United States Patent
Hayakawa et al.

(10) Patent No.: US 9,092,676 B2
(45) Date of Patent: Jul. 28, 2015

(54) OBJECT DETECTOR AND OBJECT DETECTION METHOD

(75) Inventors: Yasuhisa Hayakawa, Yokohama (JP);
Chikao Tsuchiya, Yokohama (JP);
Osamu Fukata, Sagamihara (JP);
Yukinori Nishida, Yokohama (JP);
Daisuke Oiki, Zama (JP)

(73) Assignee: Nissan Motor Co., Ltd., Yokohama (JP)

( * ) Notice: Subject to any disclaimer, the term of this patent is extended or adjusted under 35 U.S.C. 154(b) by 63 days.

(21) Appl. No.: 14/233,404

(22) PCT Filed: Jul. 27, 2012

(86) PCT No.: PCT/JP2012/069094
§ 371 (c)(1),
(2), (4) Date: Jan. 17, 2014

(87) PCT Pub. No.: WO2013/018673
PCT Pub. Date: Feb. 7, 2013

(65) Prior Publication Data
US 2014/0147007 A1    May 29, 2014

(30) Foreign Application Priority Data
Aug. 2, 2011  (JP) .................................. 2011-168904

(51) Int. Cl.
*G06K 9/00* (2006.01)
*G08G 1/16* (2006.01)

(52) U.S. Cl.
CPC ............ *G06K 9/00805* (2013.01); *G08G 1/167* (2013.01); *G06K 2209/23* (2013.01)

(58) Field of Classification Search
USPC .......................................................... 382/103
See application file for complete search history.

(56) References Cited

U.S. PATENT DOCUMENTS

| 7,765,066 | B2 * | 7/2010 | Braeuchle et al. ............ 701/301 |
| 7,782,179 | B2 * | 8/2010 | Machii et al. .................. 340/435 |
| 8,457,868 | B2 * | 6/2013 | Tange et al. .................... 701/116 |

FOREIGN PATENT DOCUMENTS

| JP | 2000-149197 A | 5/2000 |
| JP | 2003-276542 A | 10/2003 |
| JP | 2004-331023 A | 11/2004 |
| JP | 2008-100554 A | 5/2008 |
| JP | 2008-219063 A | 9/2008 |

* cited by examiner

*Primary Examiner* — Yon Couso
(74) *Attorney, Agent, or Firm* — Global IP Counselors, LLP

(57) ABSTRACT

A solid object detection device detects solid objects in the periphery of a vehicle. A camera captures images including detection regions set in adjacent traffic lanes to the rear of the vehicle. A solid object assessment unit assesses whether or not a solid object is present in the detection regions. A lateral position detection unit detects a distance between the vehicle position and a dividing line that divides traffic lanes. A region setting unit enlarges the detection region on the side of the dividing line by a greater amount correspondingly with respect to an increase in the distance to the dividing line. A traffic lane change detection unit detects a traffic lane change made by the vehicle. Upon detecting a traffic lane change by the vehicle, a smaller enlarged amount is used when enlarging the size of the predetermined region outward in the vehicle-width direction.

12 Claims, 32 Drawing Sheets

AMOUNT OF FOREIGN SUBSTANCES ADHERING TO THE LENS

OBJECT DETECTOR AND OBJECT DETECTION METHOD

CROSS-REFERENCE TO RELATED APPLICATIONS

This application is a U.S. National stage application of International Application No. PCT/JP2012/069094, filed Jul. 27, 2012, which claims priority under to Japanese Patent Application No. 2011-168904 filed in Japan on Aug. 2, 2011.

BACKGROUND

1. Field of the Invention

The present invention relates to a solid object detection device and a solid object detection method.

2. Background Information

In the past, there have been proposed vehicle periphery observation devices which use radar to assess whether or not there is a solid object in a detection region behind the vehicle, and notify the driver. With such a vehicle periphery observation device, the detection region includes a location that is a blind spot of at least a side mirror, and when the angle of the side mirror changes, the position of the detection region is changed accordingly (see Japanese Laid-Open Patent Publication No. 2000-149197).

SUMMARY

However, in the device disclosed in Japanese Laid-Open Patent Publication No. 2000-149197, there is a possibility, depending on the position of the vehicle in the traffic lane, that a solid object such as another vehicle in an adjacent traffic lane cannot be detected. To give a more detailed description, in the device disclosed in Japanese Laid-Open Patent Publication No. 2000-149197, the detection region is fixed as long as the angle of the side mirror does not change. In such a state, in cases such as when the vehicle nears the left side of the traffic lane and the other vehicle or the like in the right adjacent traffic lane is near the right side of the first traffic lane, for example, the other vehicle does not enter the detection region and the solid object can no longer be detected.

The present invention was devised in order to solve such problems in the prior art, it being an object of the invention to provide a solid object detection device and a solid object detection method whereby the precision of detecting solid objects can be improved.

The solid object detection device of the present invention captures an image including a dividing line and a predetermined region of an adjacent traffic lane, and assesses whether or not there is a solid object in the predetermined region. From the captured image, the solid object detection device detects a vehicle-widthwise distance between the vehicle position and the dividing line in the traffic lane traveled by the vehicle, and the size of the predetermined region positioned on the side where the dividing line is located increases farther outward in the vehicle-width direction in correspondence with a greater the vehicle-widthwise distance.

According to the present invention, the predetermined region in which the vehicle-widthwise distance is positioned on the side where the dividing line is located is enlarged farther outward in the vehicle-width direction correspondingly with respect to an increase in the vehicle-widthwise distance between the vehicle position and the dividing line. Therefore, it is possible to avoid situations in which due to the vehicle being separated from the dividing line, for example, the predetermined region is not set appropriate to the adjacent vehicle, and a solid object such as another vehicle is outside of the predetermined region and fails to be detected. Therefore, the precision of detecting solid objects can be improved.

BRIEF DESCRIPTION OF THE DRAWINGS

Referring now to the attached drawings which form a part of this original disclosure.

DETAILED DESCRIPTION OF THE EMBODIMENTS

Figure 1:
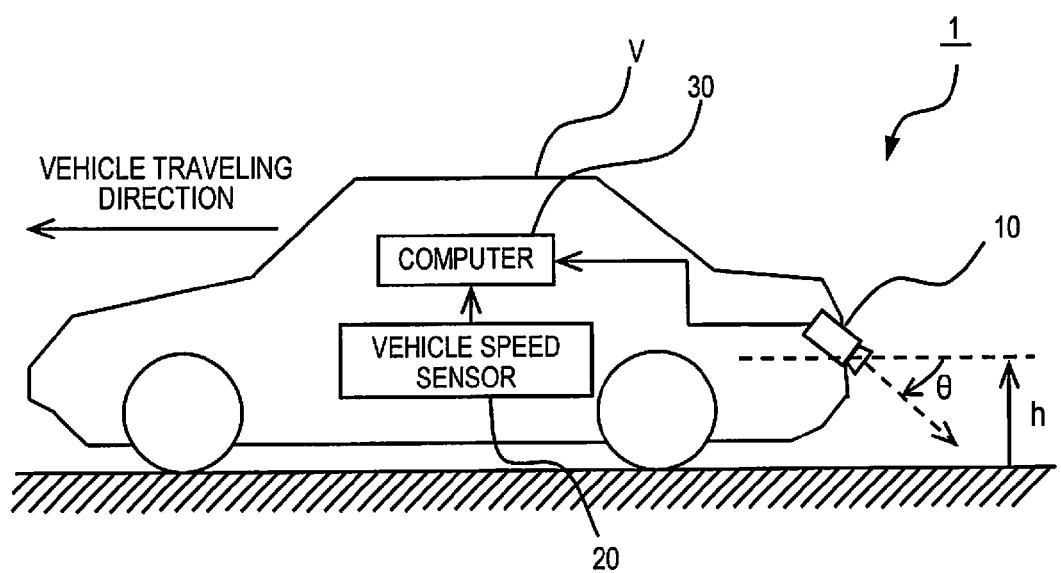
FIG. 1 is a schematic diagram of the solid object detection device according to the present embodiment, showing an example of a case in which the solid object detection device is installed in a vehicle.

Preferred embodiments of the present invention are described below based on the drawings. FIG. 1 is a schematic diagram of the solid object detection device 1 according to the present embodiment, showing an example of a case in which the solid object detection device 1 is installed in a vehicle V. The solid object detection device 1 shown in FIG. 1 detects solid objects (e.g. other vehicles, two-wheeled vehicles, etc.) traveling in an adjacent traffic lane that is adjacent to the traveled lane on which the vehicle V is traveling, the adjacent traffic lane being adjacent across a dividing line as a border; the solid object detection device 1 provides various information to the driver of the vehicle V; and the solid object detection device 1 comprises a camera (image-capturing means) 10, a vehicle speed sensor 20, and a calculator 30. The term "traveled lane" used below refers to a travel band on which the vehicle V can travel when there are no lane changes, which is also a region that excludes the dividing line. At the same time, the term "adjacent traffic lane" refers to a travel band adjacent to the traveled lane across the dividing line, which is also a region that excludes the dividing line. The dividing line is a line such as the white lines or the like that serve as the border between the traveled lane and the adjacent traffic lane.

The camera 10 shown in FIG. 1 is attached so at a location at a height h in the rear of the vehicle V, an optical axis is at an angle θ downward from horizontal. The camera 10 is designed to take images of the detection region from this position. The vehicle speed sensor 20 detects the traveling speed of the vehicle V, for which a sensor or the like for sensing the rotating speed of the wheels, for example, is applied. Based on the images captured by the camera 10, the calculator 30 detects solid objects (e.g. other vehicles, two-wheeled vehicles, etc.) located to the rear of the vehicle V.

The solid object detection device 1 also has a warning device (not shown), and issues warnings to the driver of the vehicle V in cases such as when there is a possibility of a shifting operation detected by the calculator 30 coming in contact with the vehicle V.

Figure 2:
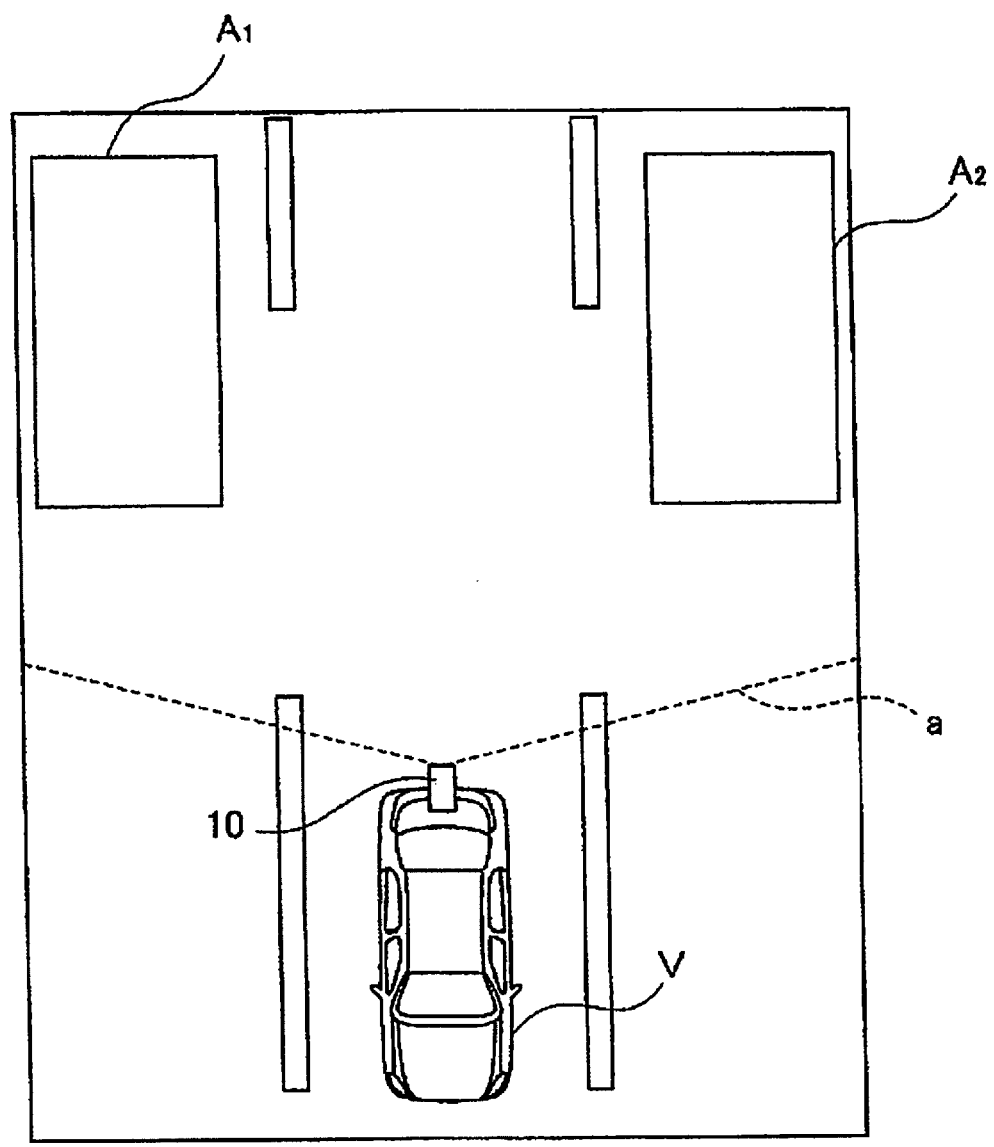
FIG. 2 is a top view showing the traveling state of the vehicle shown in FIG. 1.

FIG. 2 is an overhead view showing the traveling state of the vehicle V shown in FIG. 1. The camera 10 is capable of image-capturing a region to the rear of the vehicle V, or specifically a region including the dividing line and the adjacent traffic lane, as shown in FIG. 2. Detection regions (predetermined areas) A1, A2 for detecting solid objects such as other vehicles are set in adjacent traffic lanes that are adjacent to the traveled lane in which the vehicle V is traveling, and the calculator 30 detects whether or not there are solid objects in the detection regions A1, A2. Such detection regions A1, A2 are set from their relative positions with respect to the vehicle V.

Figure 3:
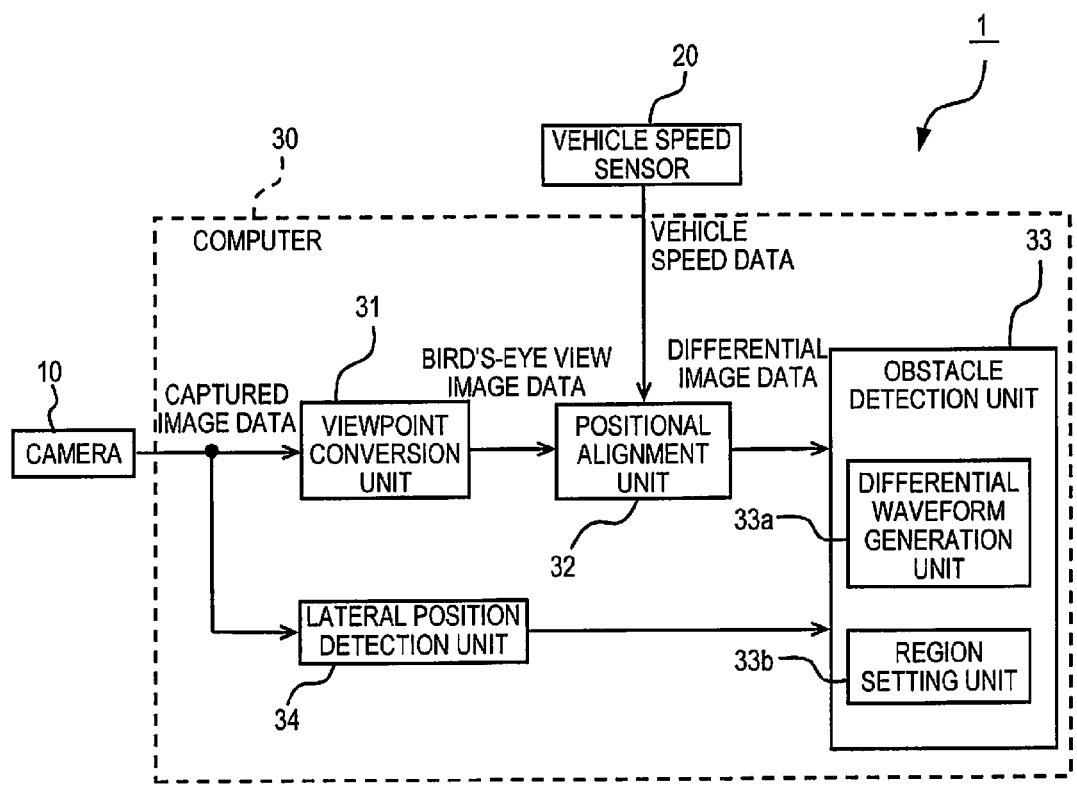
FIG. 3 is a block diagram showing the details of the calculator shown in FIG. 1.

FIG. 3 is a block diagram showing the details of the calculator 30 shown in FIG. 1. In FIG. 3, the camera 10 and the vehicle speed sensor 20 are also shown in order to give a clear depiction of the relationship of connection.

The calculator 30 comprises a visual point conversion unit 31, a positional alignment unit (positional alignment means) 32, and a solid object detection unit (solid object detection means) 33, as shown in FIG. 3.

The visual point conversion unit 31 inputs captured image data including the detection regions A1, A2 obtained by the image-capturing performed by the camera 10, and converts the viewpoint of the inputted captured image data into overhead image data which is seen as viewed from overhead. This overhead view is what would be seen from the viewpoint of an imaginary camera looking vertically downward, for example, from the air above. This viewpoint conversion is performed as is disclosed in Japanese Laid-Open Patent Publication No. 2008-219063, for example.

Figure 4:
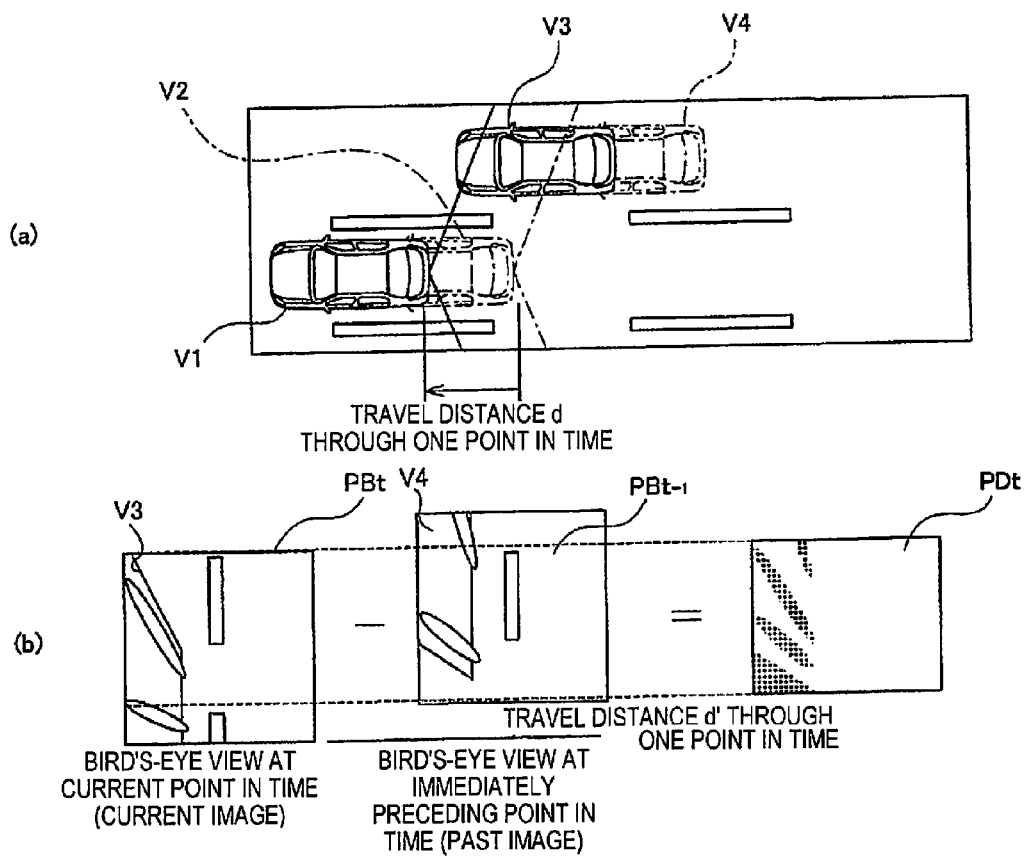
FIG. 4 is a drawing for describing an outline of the process of the positional alignment unit shown in FIG. 3, wherein (a) shows the movement state of the vehicle V and (b) shows an outline of positional alignment.

The positional alignment unit 32 sequentially inputs the overhead image data obtained by the viewpoint conversion of the visual point conversion unit 31, and matches the position of inputted overhead image data of a different time. FIG. 4 is a top view showing an outline of the process of the positional alignment unit 32 shown in FIG. 3, wherein (a) shows the movement state of the vehicle V and (b) shows an outline of positional alignment.

As shown in FIG. 4(a), the vehicle V of the current time is positioned at V1, and the vehicle V at one time prior is positioned at V2. Another vehicle V is traveling parallel to the vehicle V in a position to the rear of the vehicle V, the other vehicle V of the current time is positioned at V3, and the other vehicle V of one time prior is positioned at V4. Furthermore, the vehicle V moves a distance d in one time. The term "one time prior" may refer to a time in the past from the current time by a time duration established in advance (e.g. one control cycle), or it may refer to a time in the past by any desired time duration.

In such a state, the overhead image $PB_t$ at the current time is shown in FIG. 4(b). In the overhead image $PB_t$, the white lines painted on the road are rectangular and are in a state of being seen from above comparatively accurately. However, the other vehicle V3 is beginning to fall into the image. Similarly, in the overhead image $PB_{t-1}$ at one time prior, the white lines painted on the road are rectangular and are in a state of being seen from above comparatively accurately, but the other vehicle V4 is beginning to fall into the image.

The positional alignment unit 32 implements the positional alignment of the overhead images $PB_t$, $PB_{t-1}$ described above in terms of data. At this time, the positional alignment unit 32 offsets the overhead image $PB_{t-1}$ at the one time prior, and causes the position to coincide with the overhead image $PB_t$ at the current time. The offset amount d' is merely an amount corresponding to the movement distance d shown in FIG. 4(a), and is determined based on a signal from the vehicle speed sensor 20 and on the time duration from the one time prior to the current time.

After the positional alignment, the positional alignment unit 32 finds the differential between the overhead images $PB_t$, $PB_{t-1}$, and generates data of a differential image $PD_t$. The pixel value of the differential image $PD_t$ may be the absolute value of the difference in pixel values between the overhead images $PB_t$, $PB_{t-1}$, or, in order to correspond with changes in the illuminated environment, it may be "1" when the absolute value exceeds a predetermined value and "0" when the absolute value does not exceed a predetermined value.

FIG. 3 is again referenced. Furthermore, the calculator 30 comprises a lateral position detection unit (lateral position detection means) 34. Based on the captured image data captured by the camera 10, the lateral position detection unit 34 detects the vehicle position (specifically the side surface of the vehicle V) in the traffic lane traveled by the vehicle V, and the vehicle-widthwise distance to the dividing line that divides the traffic lane. The lateral position detection unit 34 makes it possible for the calculator 30 to detect things such as whether the vehicle is traveling through the center of the traveled lane or traveling nearer toward either the left or right side.

Furthermore, the solid object detection unit 33 detects solid objects on the basis of the data of the differential image $PD_t$ such as is shown in FIG. 4. The solid object detection unit 33 comprises a differential waveform generator (differential waveform generation means) 33a and a region setting unit (region setting means) 33b.

Figure 5:
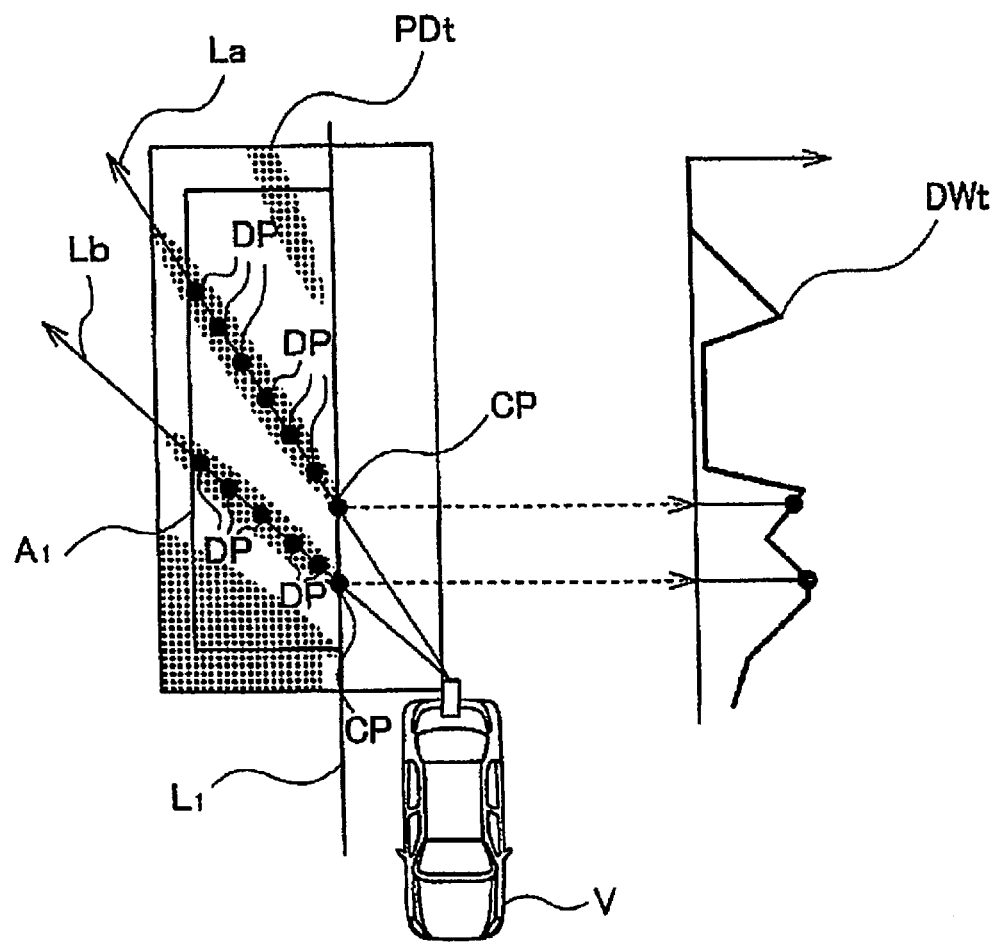
FIG. 5 is a schematic diagram showing the manner in which differential waveforms are generated by the differential waveform generator shown in FIG. 3.

FIG. 5 is a schematic diagram showing the manner in which differential waveforms are generated by the differential waveform generator 33a shown in FIG. 3. The differential waveform generator 33a generates a differential waveform $DW_t$ from the portions in the differential image $PD_t$ that are equivalent to the detection regions A1, A2, as shown in FIG. 5. At this time, the differential waveform generator 33a generates a differential waveform $DW_t$ along the direction in which the solid object falls by viewpoint conversion. In the example shown in FIG. 5, the description uses only the detection region A1 for the sake of convenience.

To give a specific description, first, the differential waveform generator 33a defines a line La along the direction in which the solid object falls in the data of the differential waveform $DW_t$. The differential waveform generator 33a then counts the number of differential pixels DP representing predetermined differentials along the line La. The differential pixels DP representing predetermined differentials herein are pixels exceeding a predetermined value when the pixel value of the differential waveform $DW_t$ is the absolute value of the difference between the pixel values of the overhead images $PB_t$, $PB_{t-1}$, and the differential pixels DP are pixels representing "1" when the pixel value of the differential waveform $DW_t$ is expressed as "0" "1."

After counting the number of differential pixels DP, the differential waveform generator 33a finds an intersection point CP of the line La and a line L1. The differential waveform generator 33a correlates the intersection point CP and the counted number, determines the horizontal axis position (a position on the up-down axis on the image plane of FIG. 5), and determines the vertical axis position (a position on the left-right axis on the image plane of FIG. 5) from the counted number.

The differential waveform generator 33a continues to similarly define a line along the direction in which the solid object falls, count the number of differential pixels DP, determine the horizontal axis position on the basis of the position of the intersection point CP, and determine the vertical axis position from the counted number (the number of differential pixels DP). The solid object detection unit 33 generates a differential waveform DW by sequentially repeating the above process and creating a frequency distribution.

As shown in FIG. 5, the lines La and Lb in the falling direction of the solid object overlap the detection region A1 in different distances. Therefore, assuming the detection region A1 is filled with differential pixels DP, the line La has more differential pixels DP than the line Lb. Therefore, when determining the vertical axis position from the counted number of differential pixels DP, the differential waveform generator 33a normalizes the vertical axis position on the basis of the distance whereby the lines La, Lb in the falling direction of the solid object and the detection region A1 overlap. To give a specific example, there are six differential pixels DP on the line La in FIG. 5, and there are five differential pixels DP on the line Lb. Therefore, when determining the vertical axis position from the counted number in FIG. 5, the differential waveform generator 33a normalizes the vertical axis position by a method such as dividing the counted number by the overlap distance. The values of the differential waveform $DW_t$ that correspond to the lines La, Lb in the falling direction of the solid object are thereby substantially equal, as shown in the differential waveform $DW_t$.

When a differential waveform $DW_t$ is generated as described above, the solid object detection unit 33 detects the solid object on the basis of the data of the differential waveform $DW_t$. At this time, the lateral position detection unit 34 first calculates an estimated speed of the solid object by correlating the differential waveform $DW_{t-1}$ of one time prior and the current differential waveform $DW_t$. When the solid object is another vehicle V, for example, the differential waveform DW is likely to have two local maximum values because differential pixels DP are easily obtained in the tire portions of the other vehicle V. Therefore, the relative speed of the other vehicle V in relation to the vehicle V can be found by finding the discrepancy between the local maximum values of the differential waveform $DW_{t-1}$ of one time prior and the current differential waveform $DW_t$. The lateral position detection unit 34 thereby finds the estimated speed of the solid object. The lateral position detection unit 34 assesses whether or not the solid object is a solid object by assessing if the estimated speed of the solid object is an appropriate speed for a solid object.

The region setting unit 33b sets the sizes of the detection regions A1, A2 shown in FIG. 2. The greater the vehicle-widthwise distance to the dividing line detected by the lateral position detection unit 34, the farther outward in the vehicle-width direction the region setting unit 33b enlarges the size of the detection region A1 or A2 positioned on the side where the dividing line is located.

Figure 6:
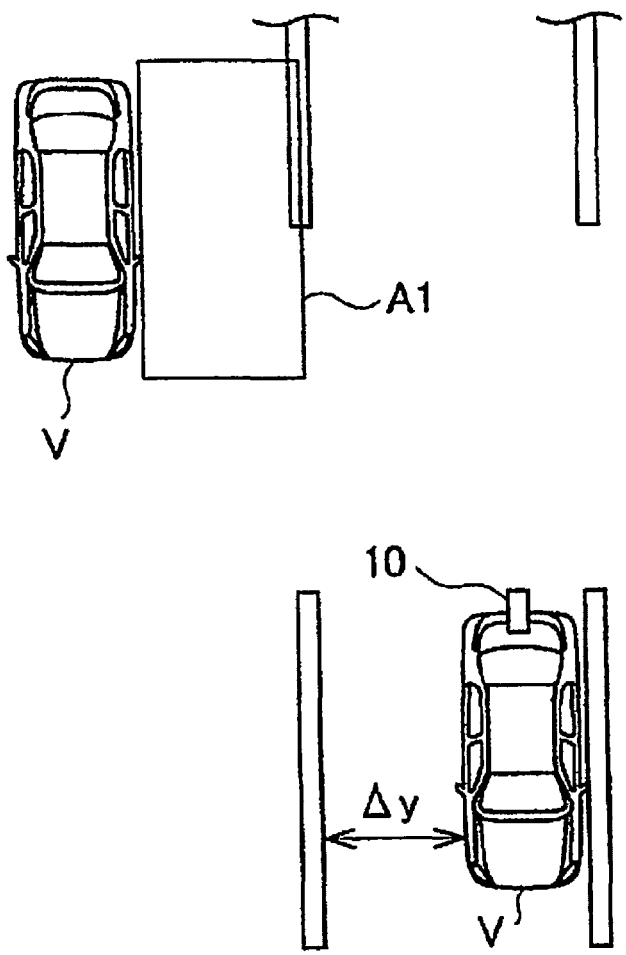
FIG. 6 is a top view showing the traveling state of the vehicle shown in FIG. 1, and showing an example of a case in which the vehicle is traveling off-center in the travel lane.

FIG. 6 is a top view showing the traveling state of the vehicle shown in FIG. 1, and showing an example of a case in which the vehicle V is traveling off-center in the travel lane. As shown in FIG. 6, the vehicle V is traveling off-center in the travel lane, and is traveling near the dividing line on the left side of the vehicle (the left side from the driver's view point).

In this case, as shown in FIG. 6, when another vehicle V is traveling at a distance from the other dividing line (the dividing line on the right side from the driver's view point), the other vehicle V will sometimes come to not be positioned in the detection region A1 located on the right side from the driver's view point. Therefore, in the present embodiment, the region setting unit 33b enlarges the detection region A1 to prevent situations that would cause detection failures.

Figure 7:
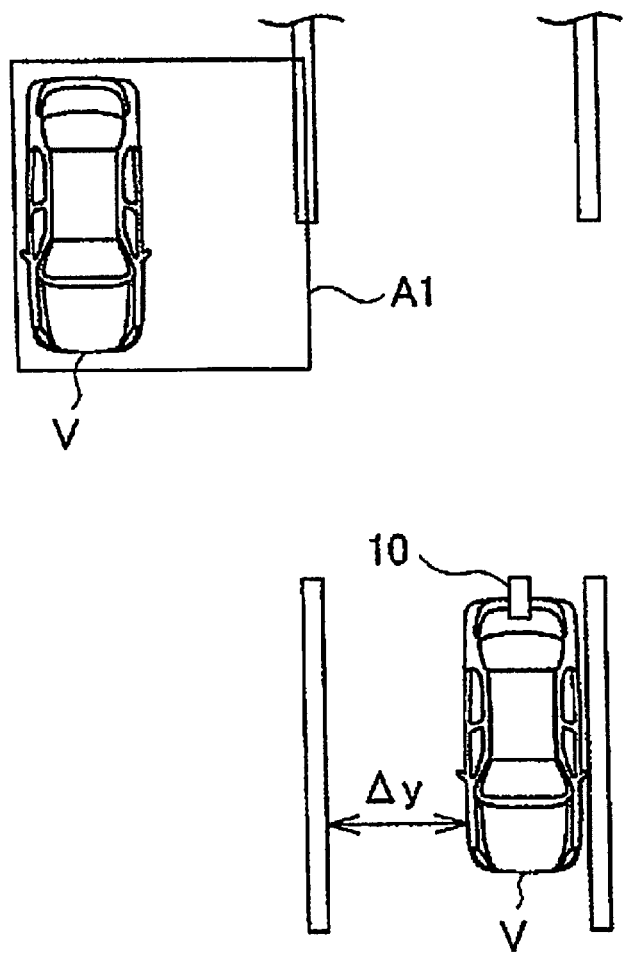
FIG. 7 is a top view showing the traveling state of the vehicle shown in FIG. 1, and showing an example of a case in which the region setting unit has enlarged the detection region.

FIG. 7 is a top view showing the traveling state of the vehicle shown in FIG. 1, and showing an example of a case in which the region setting unit 33b has enlarged the detection region A1. The detection region A1 is enlarged by the region setting unit 33b as shown in FIG. 7. The other vehicle V thereby comes to be positioned inside the detection region A1, and failures to detect the other vehicle V can be prevented.

Figure 8:
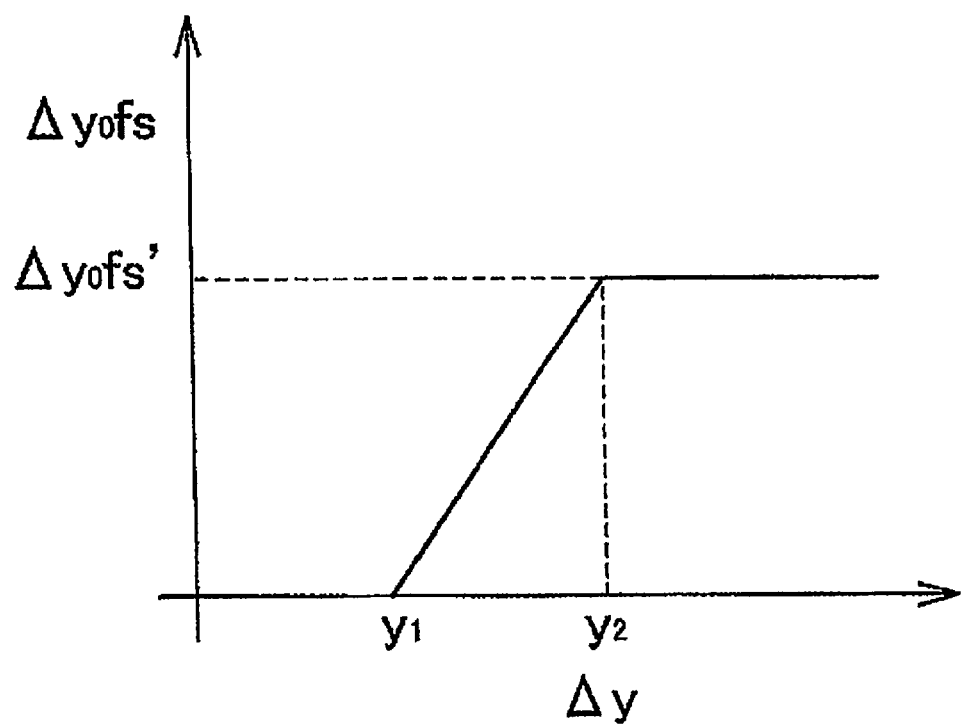
FIG. 8 is a graph showing the relationship between the vehicle-widthwise distance to the dividing line and the size (enlarged amount) of the detection region.

FIG. 8 is a graph showing the relationship between the vehicle-widthwise distance $\Delta y$ to the dividing line and the size of the detection region A1 (the enlarged amount $\Delta y_0 fs$).

When the vehicle-widthwise distance $\Delta y$ to the dividing line is between zero and y1 as shown in FIG. 8, the enlarged amount of the detection region A1 is zero. When the vehicle-widthwise distance $\Delta y$ is between y1 and y2, the enlarged amount of the detection region A1 increases according to the size of the vehicle-widthwise distance $\Delta y$. Furthermore, when the vehicle-widthwise distance $\Delta y$ exceeds y2, the enlarged amount of the detection region A1 is fixed at $y_0 fs'$. Thus, the reason the enlarged amount of the detection region A1 is fixed at the specific value of $y_0 fs'$ is because when the detection region A1 is enlarged limitlessly, there is a possibility that the detection region A1 will encompass not only the adjacent traffic lane subsequent lanes as well.

In FIG. 8, the enlarged amount of the detection region A1 comparatively increases in the interval of the vehicle-widthwise distance $\Delta y$ between y1 and y2, but this increasing is not particularly limited to a proportional increase, and may be an exponential increase or the like. As is clear from FIG. 8, when the vehicle-widthwise distance $\Delta y$ to the dividing line is short, the detection region A1 that had been enlarged is then contracted.

The description above uses only the detection region A1, but the same applies to the detection region A2 as well. In the example shown in FIG. 8, the detection region A1 is enlarged based on the vehicle-widthwise distance $\Delta y$ from the vehicle's right side surface (the right side surface from the driver's view point) to the dividing line on the right side, but when the size of the detection region A2 is varied, needless to say, the detection region is decided based on the vehicle-widthwise distance $\Delta y$ from the vehicle's left side surface (the left side surface from the driver's view point) to the dividing line on the left side.

Furthermore, the region setting unit 33b is configured to not severely vary the detection regions A1, A2. This is because when the detection regions A1, A2 are varied severely, the solid object detection becomes unstable, and there is a possibility that it will lead to solid object detection failures.

Specifically, the region setting unit 33b is designed so that the varied amount when the detection regions A1, A2 are varied does not exceed a limit value (an enlargement prescribed value or a prescribed value). To give a more specific description, the region setting unit 33b finds a target value for the sizes of the detection regions A1, A2 on the basis of the graph shown in FIG. 8. The region setting unit 33b then sequentially brings the sizes of the detection regions A1, A2 nearer to the target value within a range that does not exceed the limit value.

The enlargement limit value (enlargement prescribed value), which is the limit value when the detection regions A1, A2 are enlarged, is set to be smaller than the contraction limit value (prescribed value), which is the limit value when the detection regions A1, A2 are contracted. The detection regions A1, A2, when contracted, are thereby not contracted severely, and it is possible to prevent situations in which the other vehicle V comes out of the detection regions A1, A2 and fails to be detected due to the detection regions A1, A2 being severely contracted.

The region setting unit 33b reduces the limit value to be smaller when a solid object is detected than when a solid object is not detected. This is because it is possible to prevent situations in which the other vehicle V being detected comes out of the detection regions A1, A2 and fails to be detected due to the detection regions A1, A2 being severely contracted.

Figure 9:
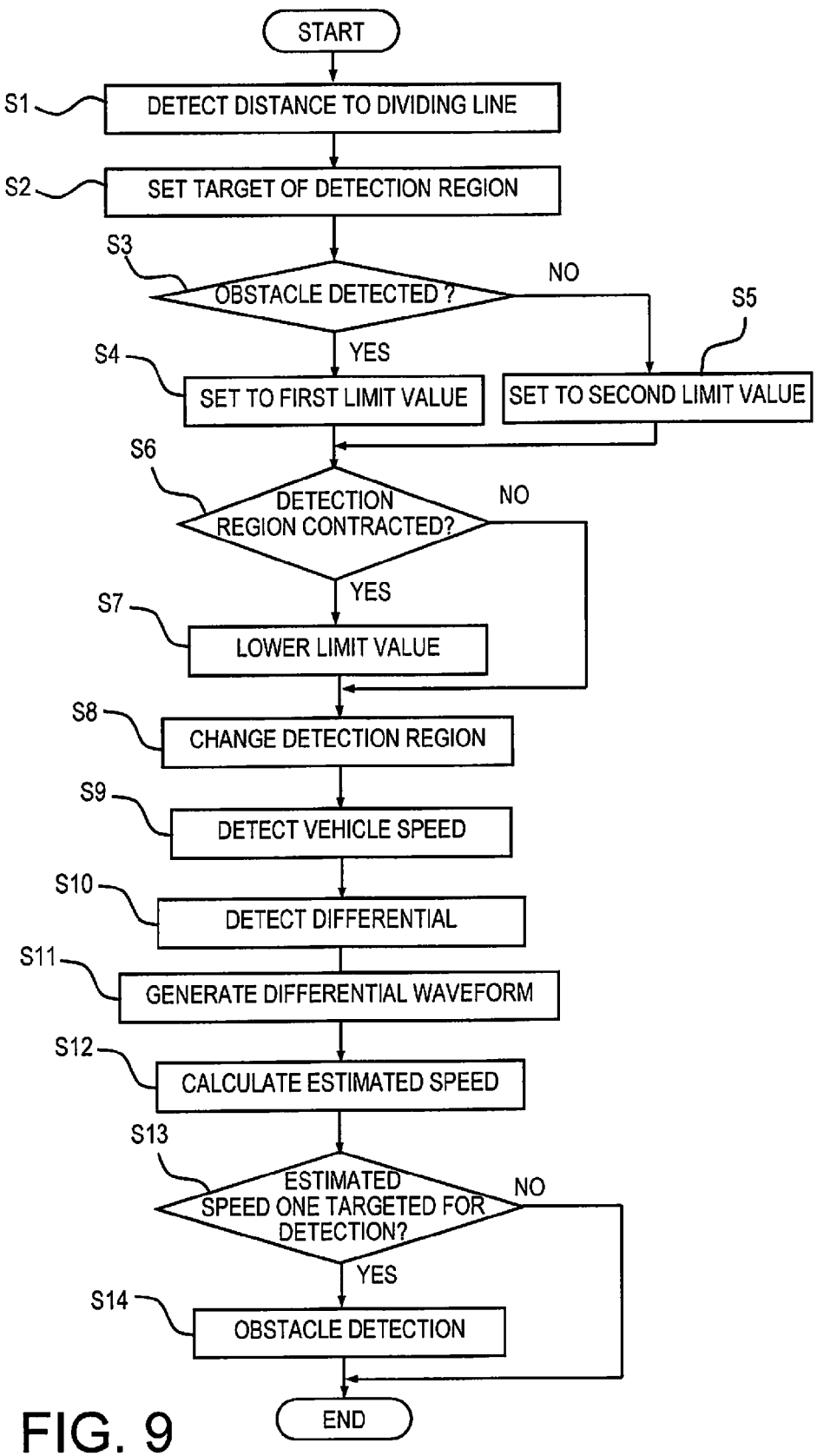
FIG. 9 is a flowchart showing the solid object detection method according to the present embodiment.

Next, the solid object detection method according to the present embodiment is described. FIG. 9 is a flowchart showing the solid object detection method according to the present embodiment.

First, as shown in FIG. 9, the lateral position detection unit 34 detects the vehicle-widthwise distance $\Delta y$ between the side surface of the vehicle V and the dividing line (S1). At this time, the lateral position detection unit 34 detects the vehicle-widthwise distance $\Delta y$ on the basis of the image data captured by the camera 10. In the present embodiment, because the detection regions A1, A2 are set to the rear on the left and right of the vehicle V, the lateral position detection unit 34 detects a vehicle-widthwise distance $\Delta y$ between both the left and right side surfaces of the vehicle V and the left and right dividing lines. For the sake of convenience in the description below, the description only uses one detection region A1 as an example, but the same applies to the other detection region A2 as well.

Next, the region setting unit 33b sets the target value of the detection region A1 (S2). At this time, the region setting unit 33b set the target value on the basis of the graph data described with reference to FIG. 8. Next, the solid object detection unit 33 assesses whether or not solid object detection is currently occurring (S3).

When it is assessed that solid object detection is occurring (S3: YES), the region setting unit 33b sets the limit value that is the upper limit of the variation amount of the detection region A1 as a first limit value (S4). The process then transitions to step S6. When it is assessed that solid object detection is not occurring (S3: NO), the region setting unit 33b sets the limit value that is the upper limit of the variation amount of the detection region A1 as a second limit value (S5). The process then transitions to step S6. The first limit value herein is less than the second limit value. Therefore, severe changes in the detection region A1 are further prevented during solid object detection.

In step S6, the solid object detection unit 33 assesses whether or not the detection region A1 will be contracted on the basis of the target value found in step S2 (S6). When it is assessed that the detection region A1 will be contracted (S6: YES), the region setting unit 33b lowers the limit value set in steps S4 and S5 (S7). Severe changes in the detection region A1 can thereby be further suppressed when the detection region A1 is contracted. The process then advances to step S8. When it is assessed that the detection region A1 will not be contracted (S6: NO), i.e. when the detection region A1 will be enlarged, the region setting unit 33b does not lower the limit value set in steps S4 and S5, and the process advances to step S8.

In step S8, the region setting unit 33b changes the size of the detection region A1 (S8). At this time, the region setting unit 33b enlarges or contracts the size of the detection region A1 within a range that does not exceed the limit value obtained via the process described above.

Next, the calculator 30 detects the vehicle speed on the basis of a signal from the vehicle speed sensor 20 (S9). Next, the positional alignment unit 32 detects the differential (S10). At this time, the positional alignment unit 32 generates data of the differential image $PD_t$ as described with reference to FIG. 4.

Next, the differential waveform generator 33a generates a differential waveform DW (S11) in the manner described with reference to FIG. 5, on the basis of the differential image $PD_t$ generated in step S10. The solid object detection unit 33 then calculates an estimated speed of the solid object (S12) by correlating the differential waveform $DW_{t-1}$ of one time prior and the current differential waveform $DW_1$.

The solid object detection unit 33 then assesses whether or not the estimated speed calculated in step S12 is a detection objective (S13). In the present embodiment, the solid object detection device 1 detects another vehicle, a two-wheeled vehicle, or the like which has the possibility of contact during a traffic lane change. Therefore, the solid object detection unit 33 assesses if the estimated speed is appropriate as a speed for another vehicle, a two-wheeled vehicle, or the like in step S13.

When it is assessed that the estimated speed is appropriate as the speed of another vehicle, a two-wheeled vehicle, or the like (S13: YES), the solid object detection unit 33 assesses that the solid object indicated by the differential waveform $DW_t$ is a solid object (another vehicle, two-wheeled vehicle, or the like) that could be a detection objective (S14). The process shown in FIG. 9 then ends. When it is assessed that the estimated speed is not appropriate as the speed of another vehicle, a two-wheeled vehicle, or the like (S13: NO), the solid object detection unit 33 assesses that the solid object indicated by the differential waveform $DW_t$ is not a solid object that could be a detection objective, and the process shown in FIG. 9 ends.

Thus, according to the solid object detection device 1 and the solid object detection method according to the present embodiment, the greater the vehicle-widthwise distance Δy between the vehicle position and the dividing line, the farther outward in the vehicle-width direction is the detection region A1 or A2 positioned on the side where the dividing line is located; therefore, it is possible to prevent situations in which due to the vehicle V being separated from the dividing line, for example, the detection region A1 or A2 is not set appropriate to the adjacent vehicle, and a solid object such as another vehicle is outside of the detection region A1 or A2 and this object fails to be detected. Therefore, the precision of detecting solid objects can be improved.

The sizes of the detection regions A1, A2 are enlarged by an enlargement limit value and the enlarged detection regions A1, A2 are then contracted inward in the vehicle-width direction by a contraction limit value smaller than the enlargement limit value; therefore, when the detection regions A1, A2 are contracted, the detection regions A1, A2 can be prevented from changing severely, and situations such as those that would cause detection failures can be further prevented.

When a solid object is detected, the limit value is reduced to less than when a solid object is not detected. Specifically, because the contraction limit value is reduced to less than the enlargement limit value, it is possible to prevent situations such as when the sizes of the detection regions A1, A2 are severely contracted during solid object detection, and the detection regions A1, A2 are extremely contracted, causing detection failures.

Second Embodiment

Next, the second embodiment of the present invention is described. The solid object detection device and the solid object detection method according to the second embodiment are similar to those of the first embodiment, but the configuration and process specifics are partially different. The points of difference with the first embodiment are described below.

Figure 10:
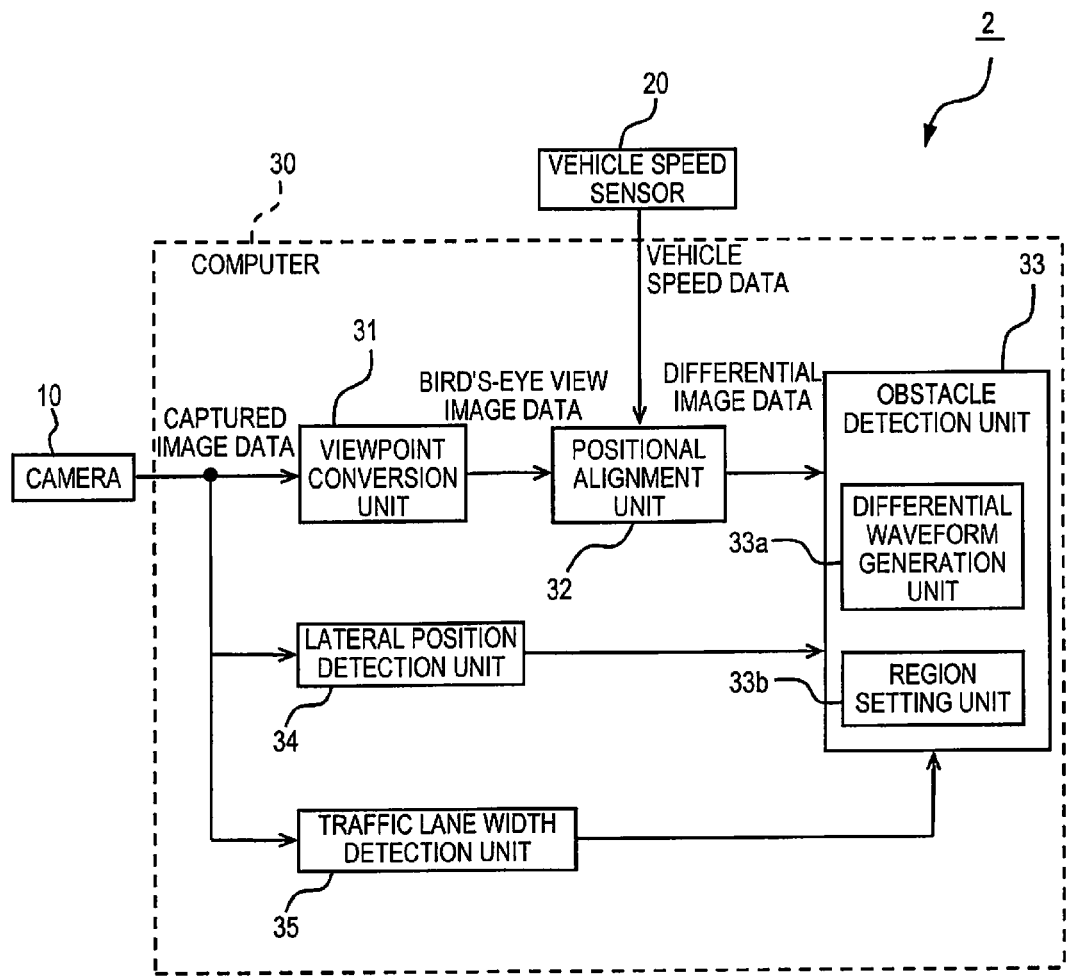
FIG. 10 is a block diagram showing the details of the calculator according to the second embodiment.

FIG. 10 is a block diagram showing the details of the calculator 30 according to the second embodiment. In FIG. 10, the camera 10 and the vehicle speed sensor 20 are also shown in order to give a clear depiction of the relationship of connection.

The calculator 30 according to the second embodiment comprises a traffic lane width detection unit (width detection means) 35, as shown in FIG. 10. The traffic lane width detection unit 35 detects the traffic lane width of the traveled lane. The traffic lane width detection unit 35 detects the traffic lane width of the traveled road on the basis of the captured image data imaged by the camera 10. The traffic lane width detection unit 35 may also detect the traffic lane width of the adjacent traffic lane and use this width as the traffic lane width of the traveled lane. This is because traffic lane widths are essentially uniform across the road.

Figure 11:
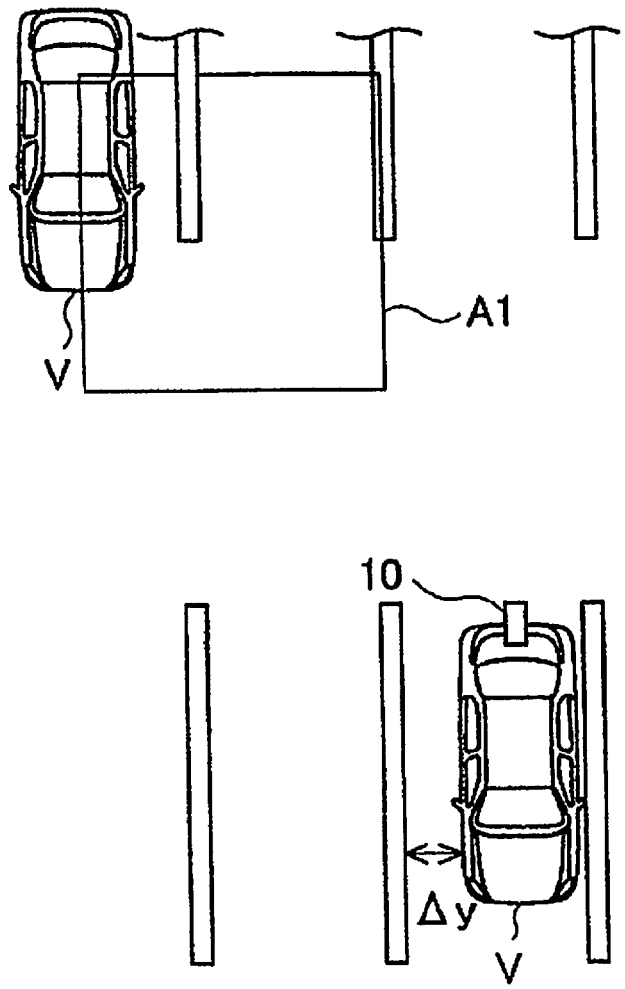
FIG. 11 is a top view showing the traveling state of the vehicle when the traffic lane width is small, and showing an example of a case in which the region setting unit has enlarged the detection region.

The vehicle traveling state when the traffic lane width is small is described herein with reference to FIG. 11. FIG. 11 is a top view showing the traveling state of the vehicle when the traffic lane width is small, and showing an example of a case in which the region setting unit 33b has enlarged the detection region A1. When the traffic lane width is small and the detection region A1 is enlarged in the same manner as in the first embodiment, there are cases in which another vehicle V in an adjacent traffic lane enters the detection region A1 as shown in FIG. 11. When solid object detection is performed based on such a detection region A1, the precision of the solid object detection decreases. The same applies for the detection region A2.

In the second embodiment, the smaller the traffic lane width detected by the traffic lane width detection unit 35, the smaller the region setting unit 33b makes the enlargement amount when enlarging the sizes of the detection regions A1, A2 outward in the vehicle-width direction.

Figure 12:
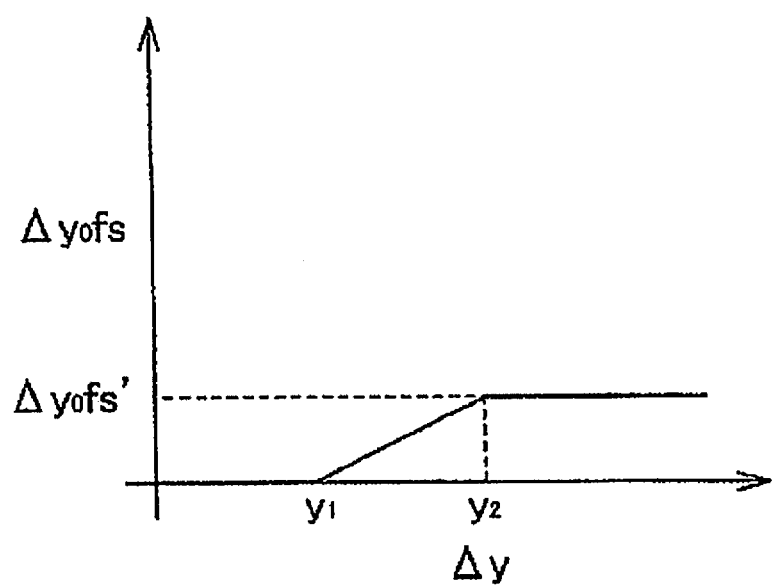
FIG. 12 is a graph showing the relationship between the vehicle-widthwise distance to the dividing line and the size (enlargement amount) of the detection region in the second embodiment.

FIG. 12 is a graph showing the relationship between the vehicle-widthwise distance Δy to the dividing line and the size (enlargement amount $\Delta y_0 fs$) of the detection region A1 in the second embodiment.

When the vehicle-widthwise distance Δy is between y1 and y2, the enlarged amount of the detection region A1 increases according to the size of the vehicle-widthwise distance Δy as shown in FIG. 12, but the enlarged amount is smaller than in the example shown in FIG. 8. Specifically, the region setting unit 33b according to the second embodiment is designed to prevent the detection region A1 from enlarging too far by reducing the enlarged amount when enlarging the detection regions A1, A2. This prevents the detection region A1 from being set in subsequent traffic lanes and the precision of solid object detection from decreasing.

In the second embodiment, the maximum limit $y_0 fs'$ is preferably reduced to less than in the example shown in FIG. 8. This is because it is thereby possible to further prevent the detection region A1 from being set in subsequent traffic lanes.

Figure 13:
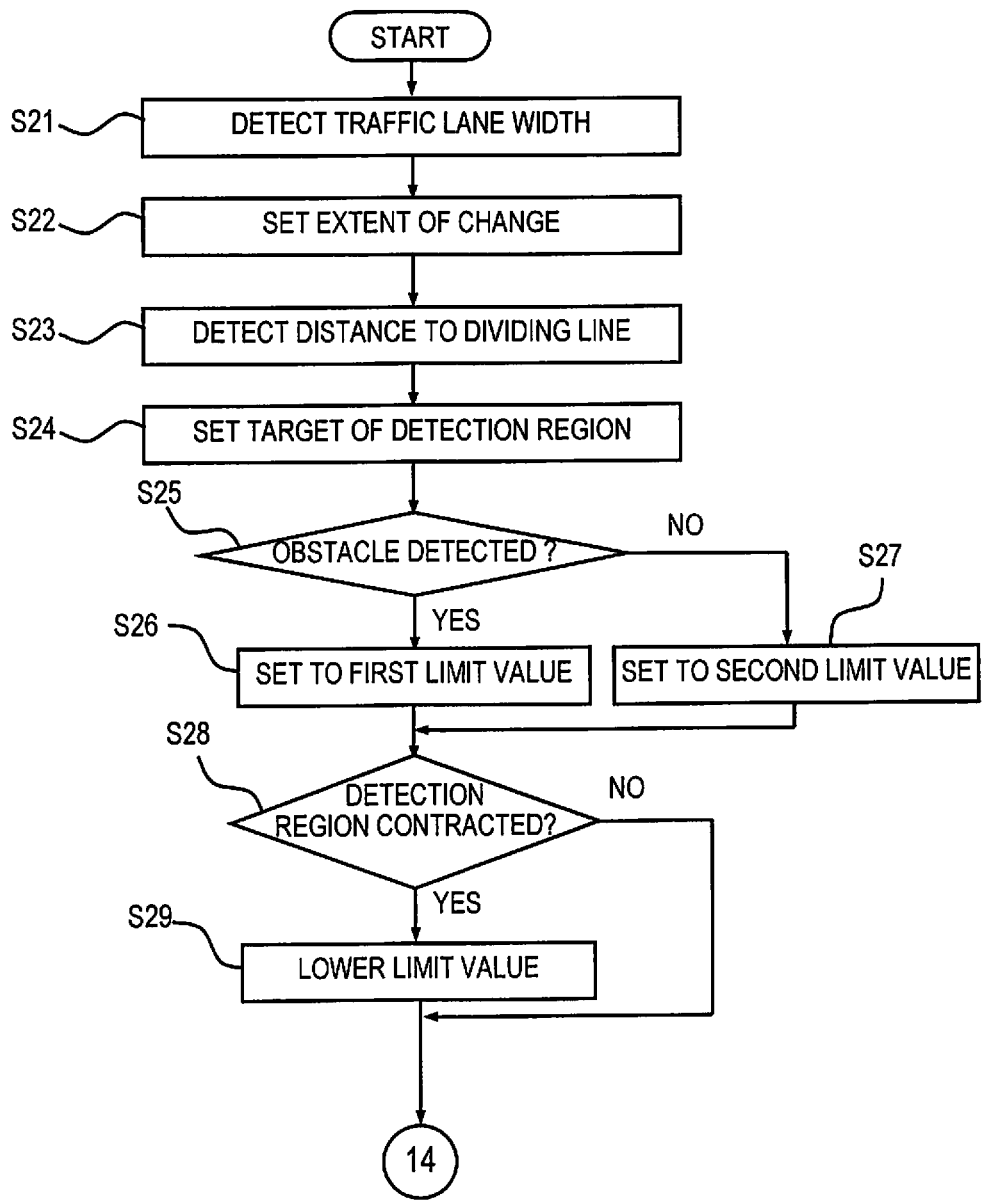
FIG. 13 is a flowchart showing the solid object detection method according to the second embodiment, showing the first half of the process.
Figure 14:
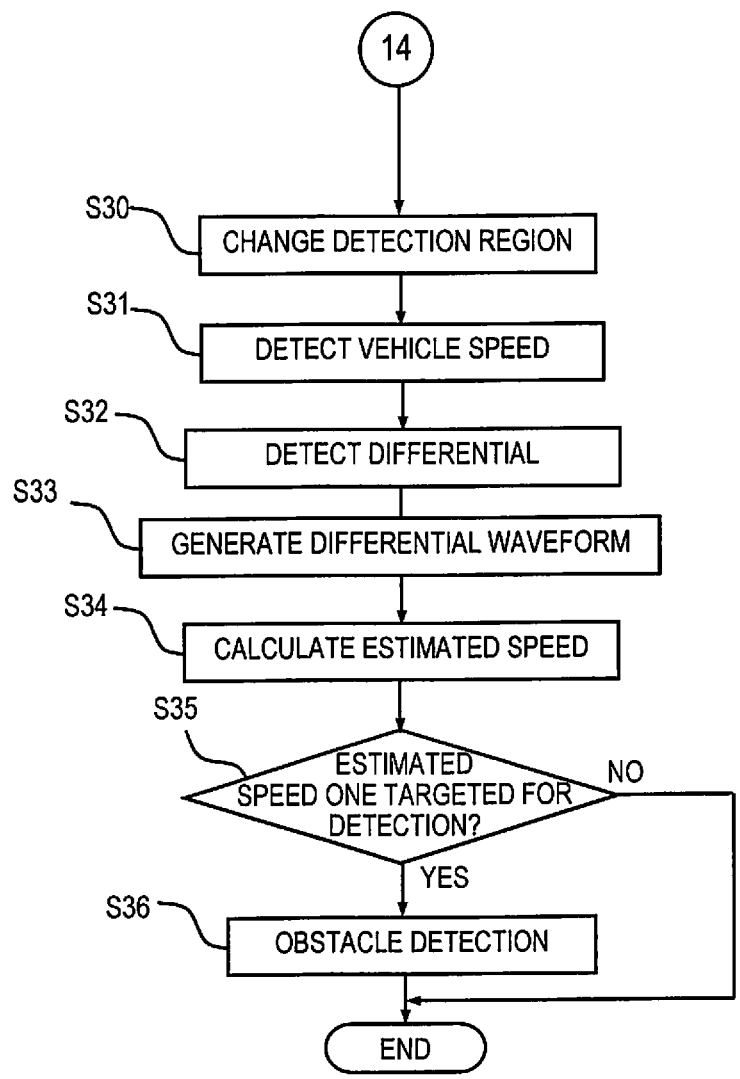
FIG. 14 is a flowchart showing the solid object detection method according to the second embodiment, showing the second half of the process.

Next, the solid object detection method according to the second embodiment is described. FIGS. 13 and 14 are flowcharts showing the solid object detection method according to the second embodiment.

First, the traffic lane width detection unit 35 detects the traffic lane width of the traveled lane on the basis of image data captured by the camera 10 (S21). The region setting unit 33b then sets an enlarged amount (S22). Specifically, the smaller the traffic lane width, the more the region setting unit 33b reduces the enlarged amount according to the vehicle-widthwise distance $\Delta y$ as shown in FIG. 12. In this process, the region setting unit 33b preferably reduces the maximum limit $y_0fs'$ as well.

In steps S23 to S36, the same process as in steps S1 to S14 shown in FIG. 9 is executed.

Thus, according to the solid object detection device 2 and the solid object detection method according to the second embodiment, the precision of detecting solid objects can be improved, and situations such as those that would cause failures to detect solid objects can be (further) prevented, similar to the first embodiment. It is also possible to prevent situations such as those in which the detection regions A1, A2 are extremely contracted, causing detection failures.

According to the second embodiment, the smaller the traffic lane width of the traveled lane, the smaller the enlarged amount when the sizes of the detection regions A1, A2 are enlarged. Therefore, in cases in which the traffic lane width it small, it is possible to prevent situations in which the detection regions A1, A2 are set not to an adjacent traffic lane but to a subsequent traffic lane.

Third Embodiment

Next, the third embodiment of the present invention will be described. The solid object detection device and the solid object detection method according to the third embodiment are similar to those of the first embodiment, but the configuration and process specifics are partially different. The points of difference with the first embodiment are described below.

Figure 15:
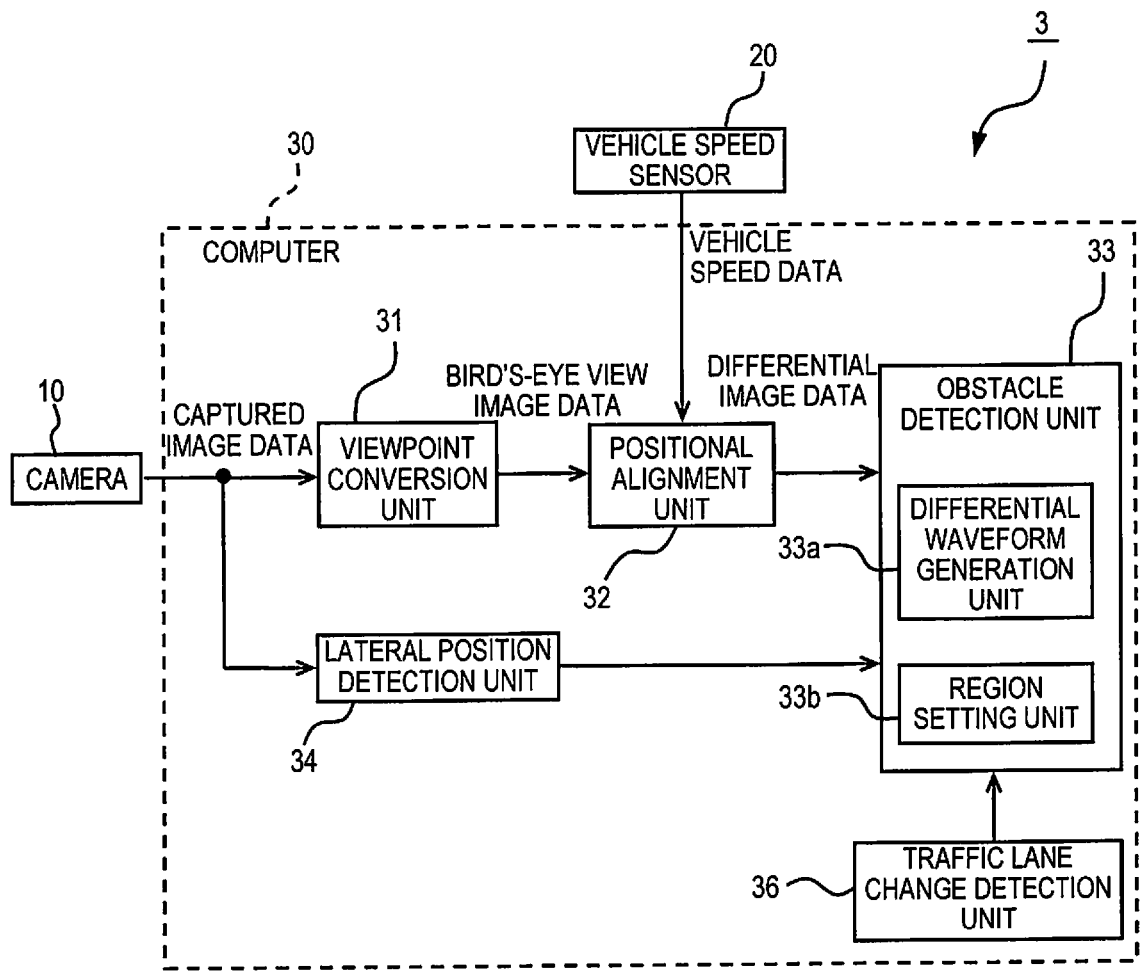
FIG. 15 is a block diagram showing the details of the calculator according to the third embodiment.

FIG. 15 is a block diagram showing the details of the calculator 30 according to the third embodiment. In FIG. 15, the camera 10 and the vehicle speed sensor 20 are also shown in order to give a clear depiction of the relationship of connection.

The calculator 30 according to the third embodiment comprises a traffic lane change detection unit (traffic lane variation detection means) 36, as shown in FIG. 15. The traffic lane change detection unit 36 detects traffic lane changes by the vehicle V, calculates the extent of nearness to the dividing line on the basis of the image data obtained by the image-capturing performed by the camera 10, for example, and assesses whether or not the vehicle V is changing traffic lanes. The traffic lane change detection unit 36 is not limited to the above process, and may assess traffic lane changes from the steered amount or by some other method.

Specifically, the traffic lane change detection unit 36 detects that the vehicle V is changing traffic lanes when the side surface of the vehicle V comes within a predetermined distance (e.g. 10 cm) of the dividing line. The traffic lane change detection unit 36 may also be designed to detect that the vehicle V is not changing traffic lanes when the side surface of the vehicle comes within a predetermined distance of the dividing line but then again separates from the dividing line by at least the predetermined distance. Furthermore, the traffic lane change detection unit 36 may assess that the traffic lane change is complete when the vehicle is separated from the dividing line by at least the predetermined distance after having changed traffic lanes (i.e., when the vehicle is separated from the dividing line by at least the predetermined distance after having crossed the dividing line by changing lanes.

Figure 16:
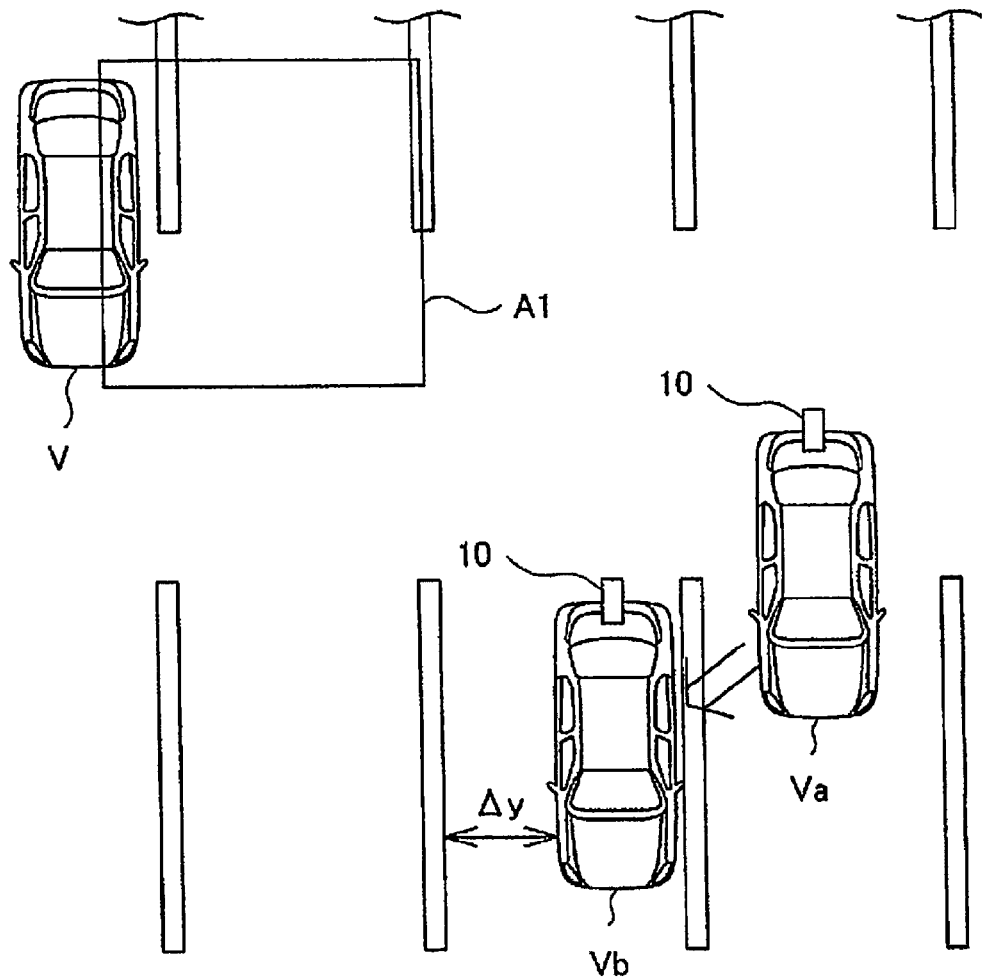
FIG. 16 is a top view showing the traveling state of the vehicle during a traffic lane change.

The manner in which the vehicle changes traffic lanes is described with reference to FIG. 16. FIG. 16 is a top view showing the traveled lane of the vehicle when the vehicle is changing traffic lanes. As shown in FIG. 16, the vehicle V is positioned in the center of the traffic lane (see the symbol Va), and the vehicle then changes traffic lanes and reaches the position Vb. At this time, the vehicle-widthwise distance $\Delta y$ between the side surface of the vehicle V and the dividing line is temporarily longer. Therefore, the detection region A1 is enlarged and there is a possibility of another vehicle V in a subsequent traffic lane entering the detection region A1. In such cases, the precision of solid object detection is reduced.

Figure 17:
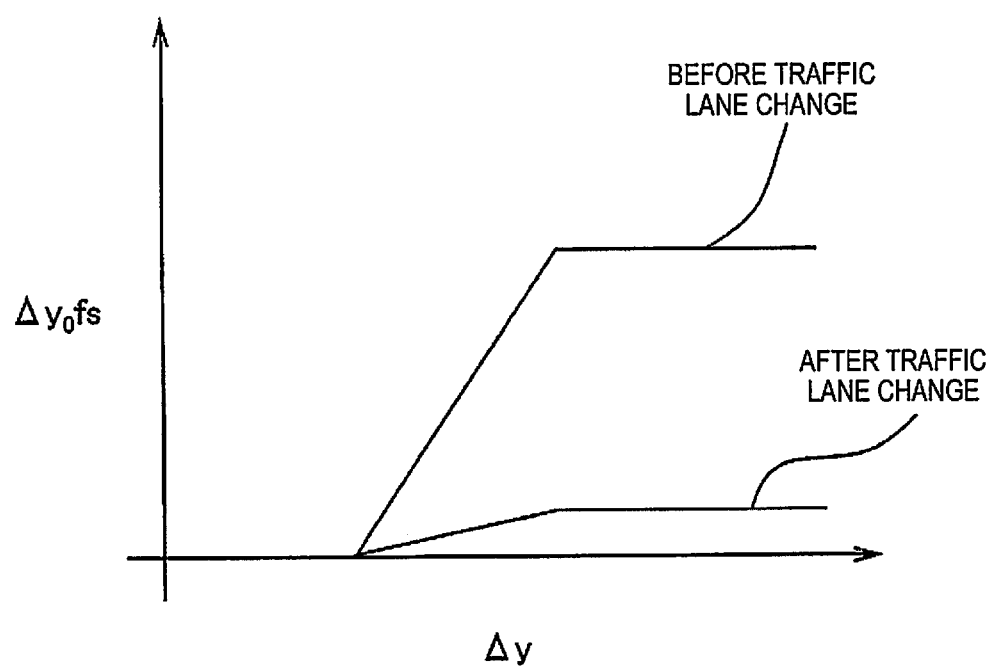
FIG. 17 is a graph showing the relationship between the vehicle-widthwise distance to the dividing line and the size (enlargement amount) of the detection region in the third embodiment.

In view of this, in the third embodiment, when a traffic lane change made by the vehicle V is detected by the traffic lane change detection unit 36, for a certain time duration, the region setting unit 33b reduces the enlarged amount when the sizes of the detection regions A1, A2 are enlarged. Specifically, when a traffic lane change made by the vehicle V is detected by the traffic lane change detection unit 36, for a certain time duration, the region setting unit 33b reduces the enlarged amount $\Delta y_0fs$ of the detection region A1 or A2 relative to the vehicle-widthwise distance $\Delta y$ between the side surface of the vehicle V shown in FIG. 16 and the dividing line. Specifically, during the certain time duration aver the traffic lane change made by the vehicle V is detected, the region setting unit 33b reduces the enlarged amount $\Delta y_0fs$ of the detection region A1 or A2 relative to the vehicle-widthwise distance $\Delta y$ between the side surface of the vehicle V and the dividing line to be less than before the traffic lane change, as shown in FIG. 17. It is thereby possible to prevent situations in which the detection region A1 or A2 is temporarily enlarged by too much during a traffic lane change. FIG. 17 is a graph showing the relationship between the vehicle-widthwise distance and the size of the detection region (the enlarged amount $\Delta y_0fs$) in the third embodiment.

Figure 18:
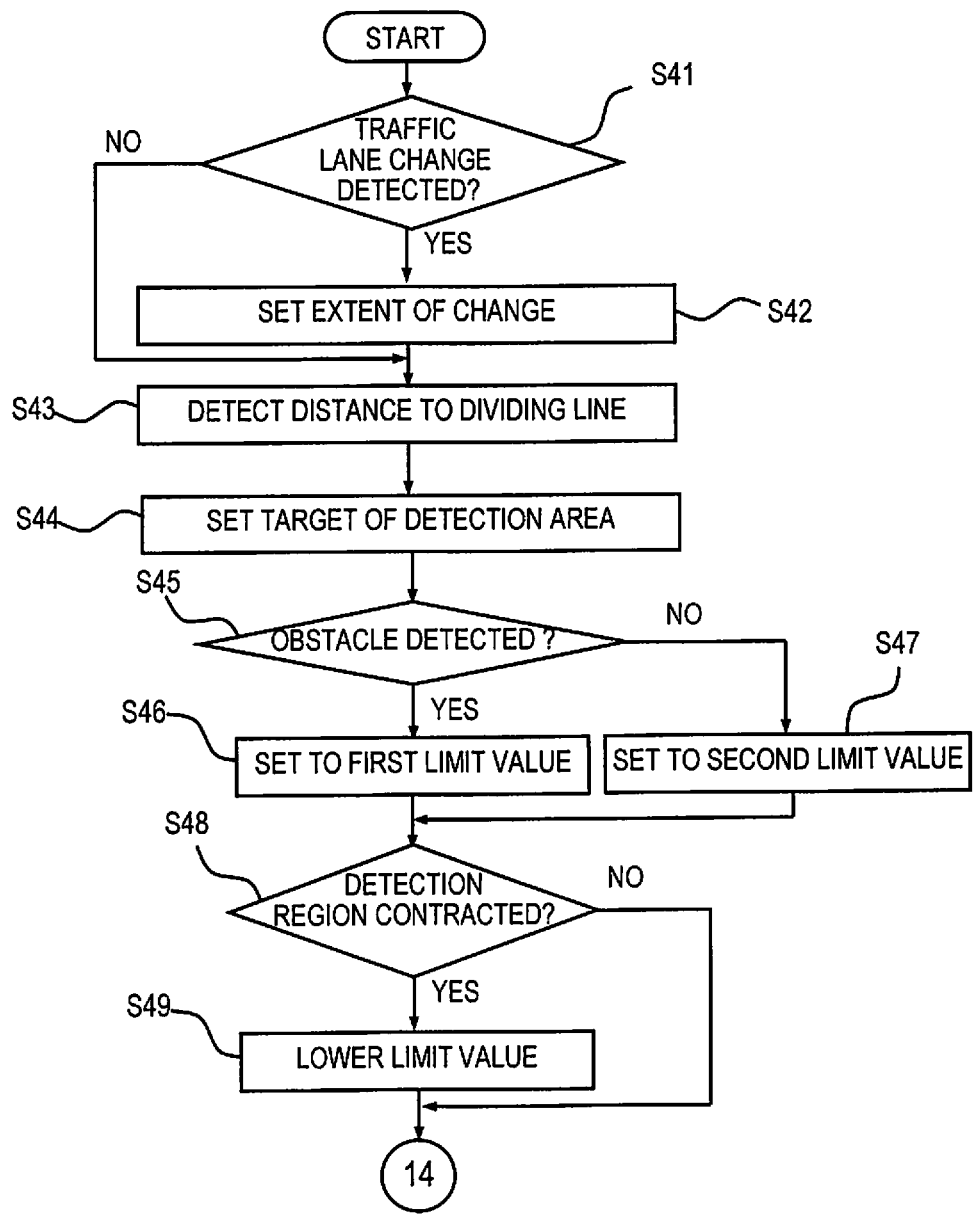
FIG. 18 is a flowchart showing the solid object detection method according to the third embodiment, showing the first half of the process.
Figure 19:
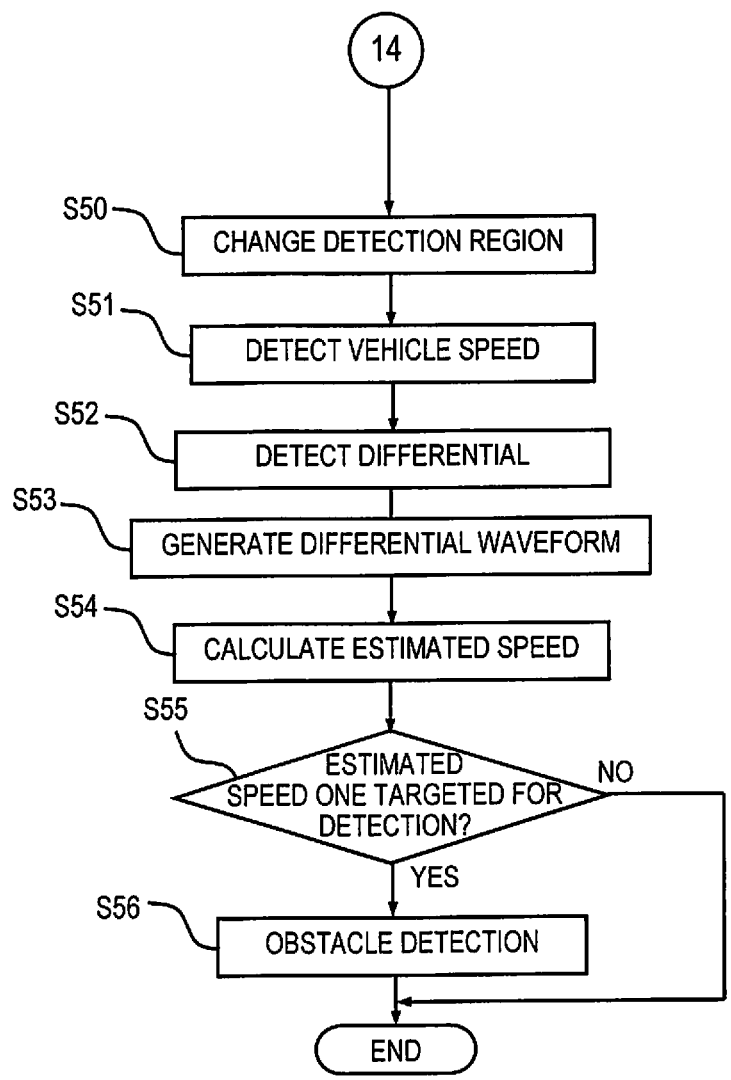
FIG. 19 is a flowchart showing the solid object detection method according to the third embodiment, showing the second half of the process.

Next, the solid object detection method according to the third embodiment is described. FIGS. 18 and 19 are flowcharts showing the solid object detection method according to the third embodiment.

First, based on the image data captured by the camera 10, the traffic lane change detection unit 36 calculates the extent of nearness to the dividing line and assesses whether or not the vehicle V is changing traffic lanes (S41). When it is assessed that the vehicle V is not changing traffic lanes (S41: NO), the process advances to step S43. When it is assessed that the vehicle V is changing traffic lanes (S41: YES), the region setting unit 33b sets the enlarged amount (S42). Specifically, the region setting unit 33b reduces the enlarged amount according to the vehicle-widthwise distance $\Delta y$, as shown in FIG. 17. In this process, the region setting unit 33b preferably reduces the maximum limit $y_0fs'$ as well.

In steps S43 to S56, the same process as in steps S1 to S14 shown in FIG. 9 is executed.

Thus, according to the solid object detection device 3 and the solid object detection method according to the third embodiment, the precision of detecting solid objects can be improved, and situations such as those that would cause failures to detect solid objects can be (further) prevented, similar to the first embodiment. It is also possible to prevent situations such as those in which the detection regions A1, A2 are extremely contracted, causing detection failures.

According to the third embodiment, when a traffic lane change made by the vehicle V is detected, the enlarged amount for enlarging the sizes of the detection regions A1, A2 is reduced. Therefore, it is possible to prevent situations in which, while the vehicle is temporarily near the dividing line while changing traffic lanes, the detection regions A1, A2 are set not to an adjacent traffic lane but to a subsequent traffic lane.

Fourth Embodiment

Next, the fourth embodiment of the present invention is described. The solid object detection device and the solid object detection method according to the fourth embodiment are similar to those of the first embodiment, but the configuration and process specifics are partially different. The points of difference with the first embodiment are described below.

Figure 20:
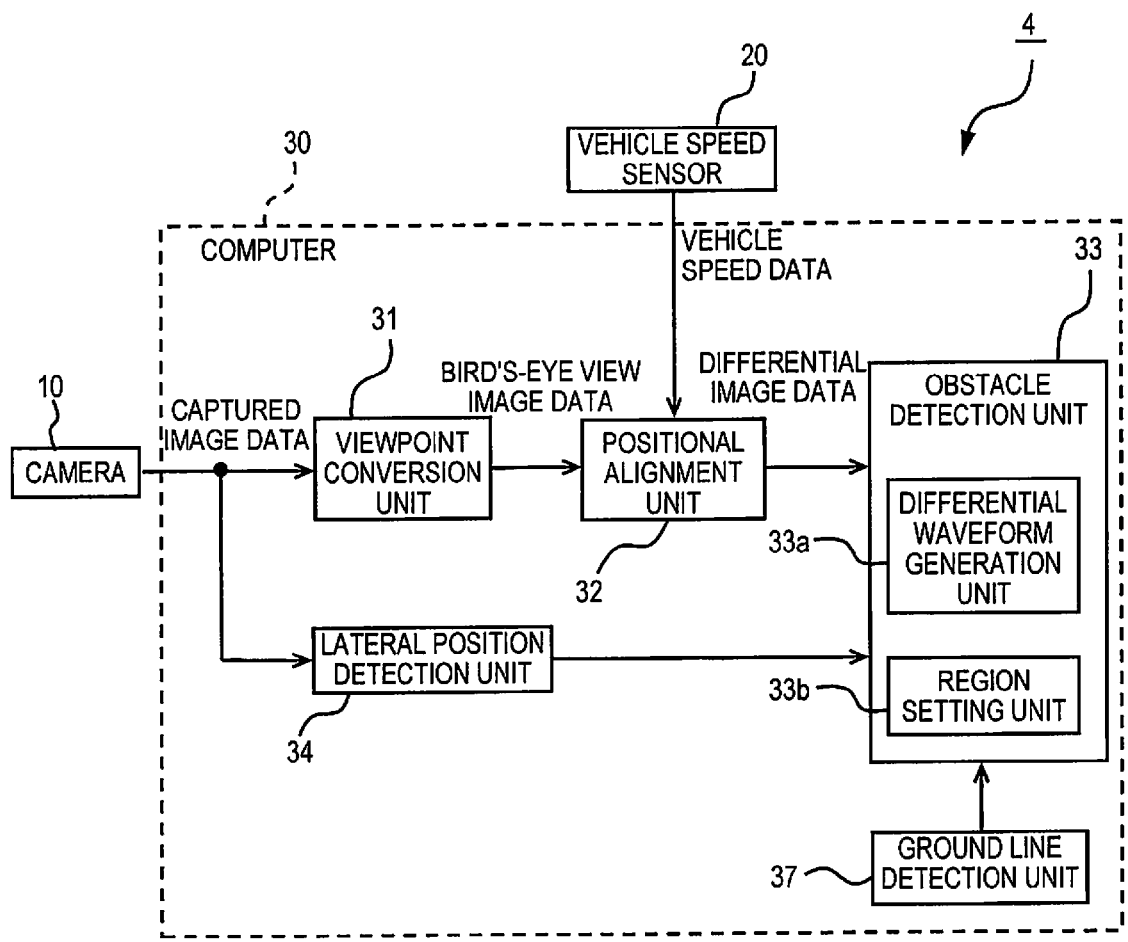
FIG. 20 is a block diagram showing the details of the calculator 30 according to the fourth embodiment.

FIG. 20 is a block diagram showing the details of the calculator 30 according to the fourth embodiment. In FIG. 20, the camera 10 and the vehicle speed sensor 20 are also shown in order to give a clear depiction of the relationship of connection.

Figure 21:
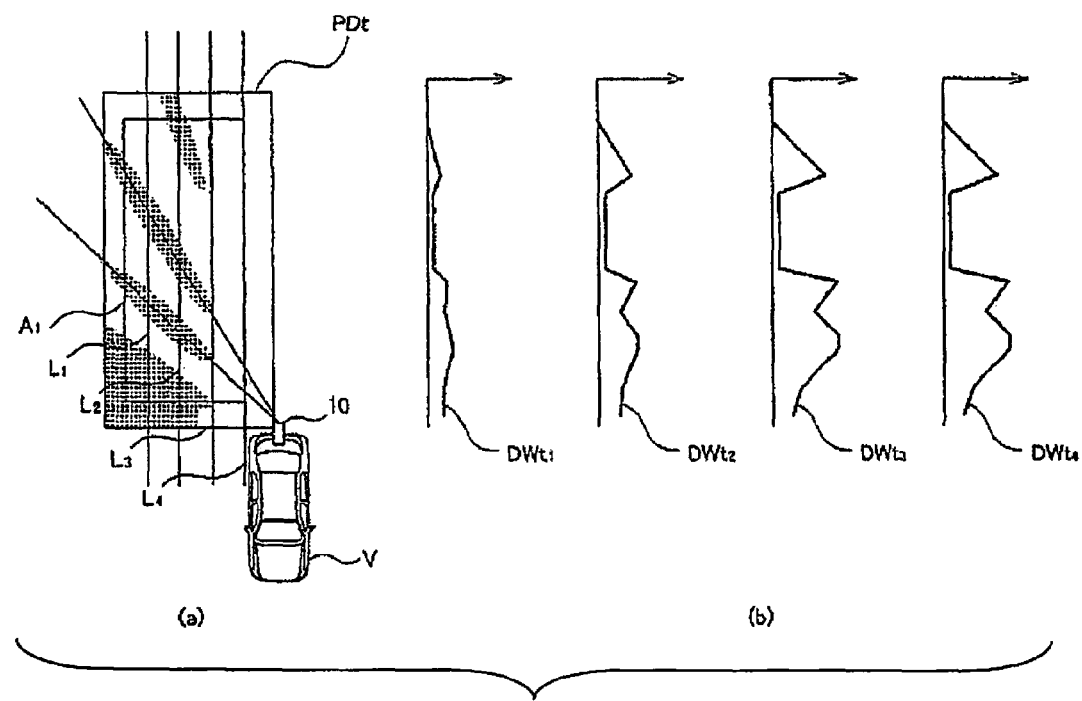
FIG. 21 is a schematic diagram showing the specifics of the process performed by the ground line detection unit 37.
Figure 22:
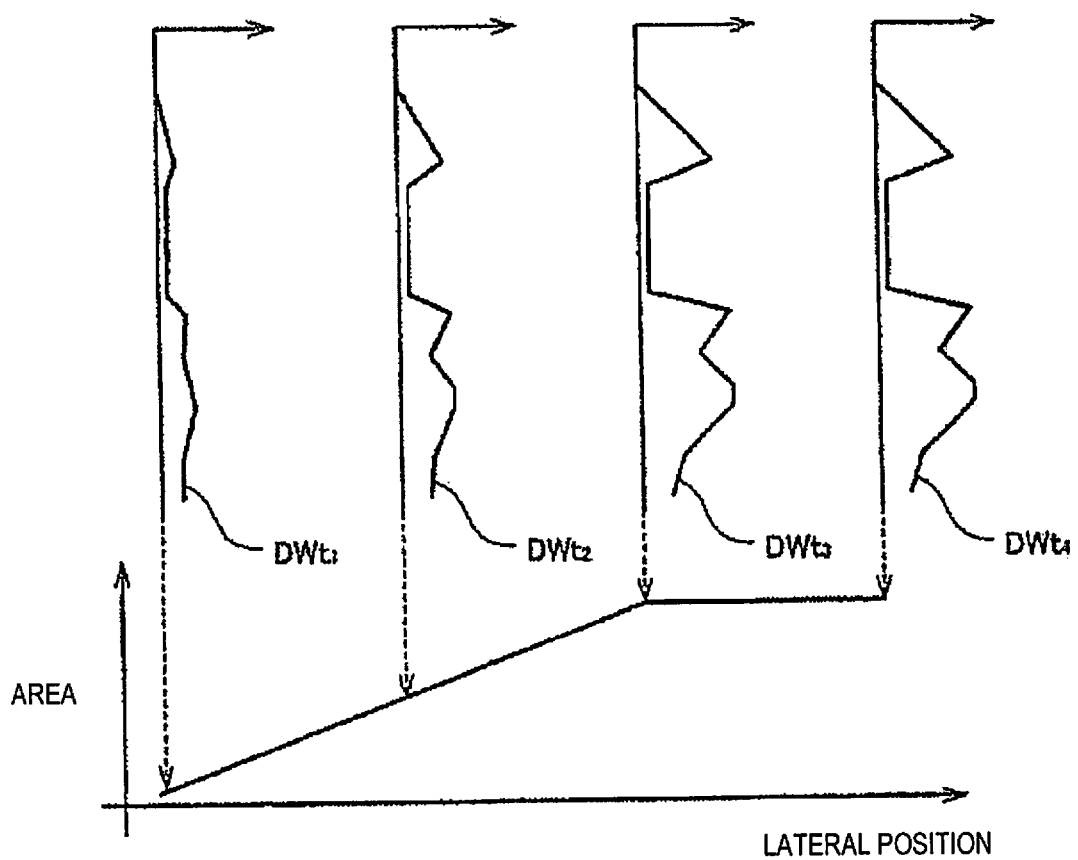
FIG. 22 is a graph showing the rates of increase in the areas of the plurality of differential waveforms $DW_{t1}$ to $DW_{t4}$ shown in part (b) of FIG. 21.

The calculator 30 according to the fourth embodiment comprises a ground line detection unit 37, as shown in FIG. 20. The ground line detection unit 37 detects the positions where the tires of another vehicle V traveling on an adjacent traffic lane (positions in the vehicle-width direction) as ground lines. The details are described below using FIGS. 21 and 22. FIGS. 21 and 22 are diagrams for describing the method of detecting ground lines by the ground line detection unit 37.

First, the ground line detection unit 37 sets a plurality of lines $L_1$ to $L_n$ at different positions in the detection region A1 or A2, the lines being substantially parallel with the traveling direction of the vehicle V. For example, in the example shown in FIG. 21, the ground line detection unit 37 sets four substantially parallel lines. The following description uses four substantially parallel lines $L_1$ to $L_4$ as an example, but the lines are not limited to this example, and there may be two, three, five, or more parallel lines.

The ground line detection unit 37 then causes the differential waveform generator 33a to generate differential waveforms $DW_t$ for the set lines $L_1$ to $L_4$. Specifically, after causing the differential waveform generator 33a to count the number of differential pixels DP, the ground line detection unit 37 finds the intersecting points CP between the lines $L_1$ to $L_4$ and the line La along the direction in which the solid object falls in the data of the differential waveform $DW_t$, and causes the differential waveform generator 33a to generate a differential waveform $DW_t$ for each of the lines $L_1$ to $L_4$ by correlating the intersection points CP and the counted number. The ground line detection unit 37 can thereby obtain a plurality of differential waveforms as shown in part (b) of FIG. 21. In part (b) of FIG. 21, the differential waveform $DW_{t1}$ is based on the substantially parallel line $L_1$, the differential waveform $DW_{t2}$ is based on the substantially parallel line $L_2$, the differential waveform $DW_0$ is based on the substantially parallel line $L_3$, and the differential waveform $DW_{t4}$ is based on the substantially parallel line $L_4$.

Referring to the plurality of differential waveforms $DW_{t1}$ to $DW_{t4}$, the differential waveform $DW_0$ based on the substantially parallel line $L_3$ near the vehicle V has more of a tendency for frequency to increase than the differential waveforms $DW_{t1}$, $DW_{t2}$ based on the substantially parallel lines $L_1$, $L_2$ farther from the vehicle V. This is because the other vehicle V is a solid object, and the other vehicle V therefore assuredly extends to an infinite distance within the differential image $PD_t$. However, the differential waveform $DW_0$ and the differential waveform $DW_{t4}$ have the same frequency. This is because the substantially parallel lines $L_3$, $L_4$ both overlap the other vehicle V in the differential image $PD_t$. Specifically, this is because there are no differential pixels DP between the substantially parallel line $L_3$ and line $L_4$.

The ground line detection unit 37 assesses the ground line $L_t$ of the other vehicle V from the changes in the shapes of the plurality of differential waveforms $DW_{t1}$ to $DW_{t4}$ described above. In the case of the example shown in part (b) of FIG. 21, the ground line detection unit 37 assesses the substantially parallel line $L_3$ to be the ground line $L_t$. Specifically, the ground line $L_t$ is assessed from the rates of increase in region shown in FIG. 22. FIG. 22 is a graph showing the rates of increase in the areas of the plurality of differential waveforms $DW_{t1}$ to $DW_{t4}$ shown in part (b) of FIG. 21. The ground line detection unit 37 references the rates of increase in region from farthest the substantially parallel line among the calculated areas toward the nearest substantially parallel line, as shown in FIG. 22. The region of the differential waveform $DW_0$ exhibits a rate of increase that is constant relative to the region of the differential waveform $DW_{t1}$, and the region of the differential waveform $DW_0$ exhibits a rate of increase that is constant relative to the region of the differential waveform $DW_{t2}$. The region of the differential waveform $DW_{t4}$ and the region of the differential waveform $DW_0$ are equal, and the rate of increase is a predetermined value or less. This is because there are no differential pixels DP between the substantially parallel line $L_3$ and line $L_4$ as described above. Specifically, it can be estimated that there is no solid object (e.g. tires of an adjacent vehicle) between the substantially parallel line $L_3$ and line $L_4$. Consequently, the ground line detection unit 37 detects the substantially parallel line $L_3$ as the ground line $L_t$ of the other vehicle V.

Figure 23:
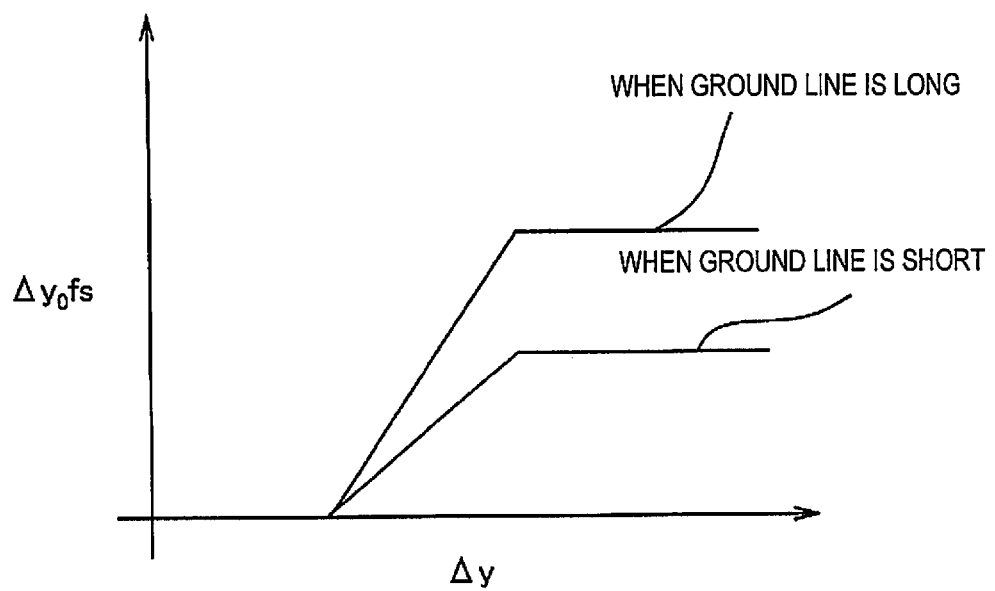
FIG. 23 is a graph showing the relationship between the vehicle-widthwise distance to the dividing line and the size (enlargement amount) of the detection region in the fourth embodiment.

Returning to FIG. 20, the region setting unit 33b according to the fourth embodiment enlarges the sizes of the detection regions A1, A2 on the basis of the vehicle-widthwise distance $\Delta y$ between the side surface of the vehicle V and the dividing line, similar to the first embodiment. Furthermore, in the fourth embodiment, the region setting unit 33b changes the enlarged amount $\Delta y_0 fs$ when enlarging the detection regions A1, A2 outward in the vehicle-width direction, on the basis of the ground line $L_t$ of the other vehicle V detected by the ground line detection unit 37. Specifically, the shorter the vehicle-widthwise distance from the side surface of the vehicle V1 to the ground line $L_t$ of the other vehicle V, the more the region setting unit 33b reduces the enlarged amount $\Delta y_0 fs$ when enlarging the sizes of the detection regions A1, A2, as shown in FIG. 23.

Thus, according to the solid object detection device 4 and the solid object detection method according to the fourth embodiment, the precision of detecting solid objects can be improved, and situations such as those that would cause failures to detect solid objects can be (further) prevented, similar to the first embodiment. It is also possible to prevent situations such as those in which the detection regions A1, A2 are extremely contracted, causing detection failures.

According to the fourth embodiment, the ground line $L_t$ of the other vehicle V traveling in an adjacent traffic lane is detected, and the shorter the distance from the side surface of the vehicle V to the ground line $L_t$, the more the changed amount $\Delta y_0 fs$ is reduced when the sizes of the detection regions A1, A2 are enlarged. In cases such as when another vehicle V can be appropriately detected in an adjacent traffic lane even when the distance in the vehicle-width direction from the side surface of the vehicle V to the adjacent vehicle is short and the enlarged amount whereby the sizes of the detection regions A1, A2 are enlarged is minimized, it is thereby possible in the fourth embodiment to minimize the changed amount $\Delta y_0 fs$ when the sizes of the detection regions A1, A2 are enlarged, and thereby effectively prevent the detection regions A1, A2 from being set to subsequent traffic lanes or outside of the road, and to prevent other vehicles traveling in subsequent traffic lanes, grass outside the road, and the like from being mistakenly detected as adjacent vehicles.

Fifth Embodiment

Next, the fifth embodiment of the present invention is described. The solid object detection device and the solid object detection method according to the fifth embodiment are similar to those of the first embodiment, but the configuration and process specifics are partially different. The points of difference with the first embodiment are described below.

Figure 24:
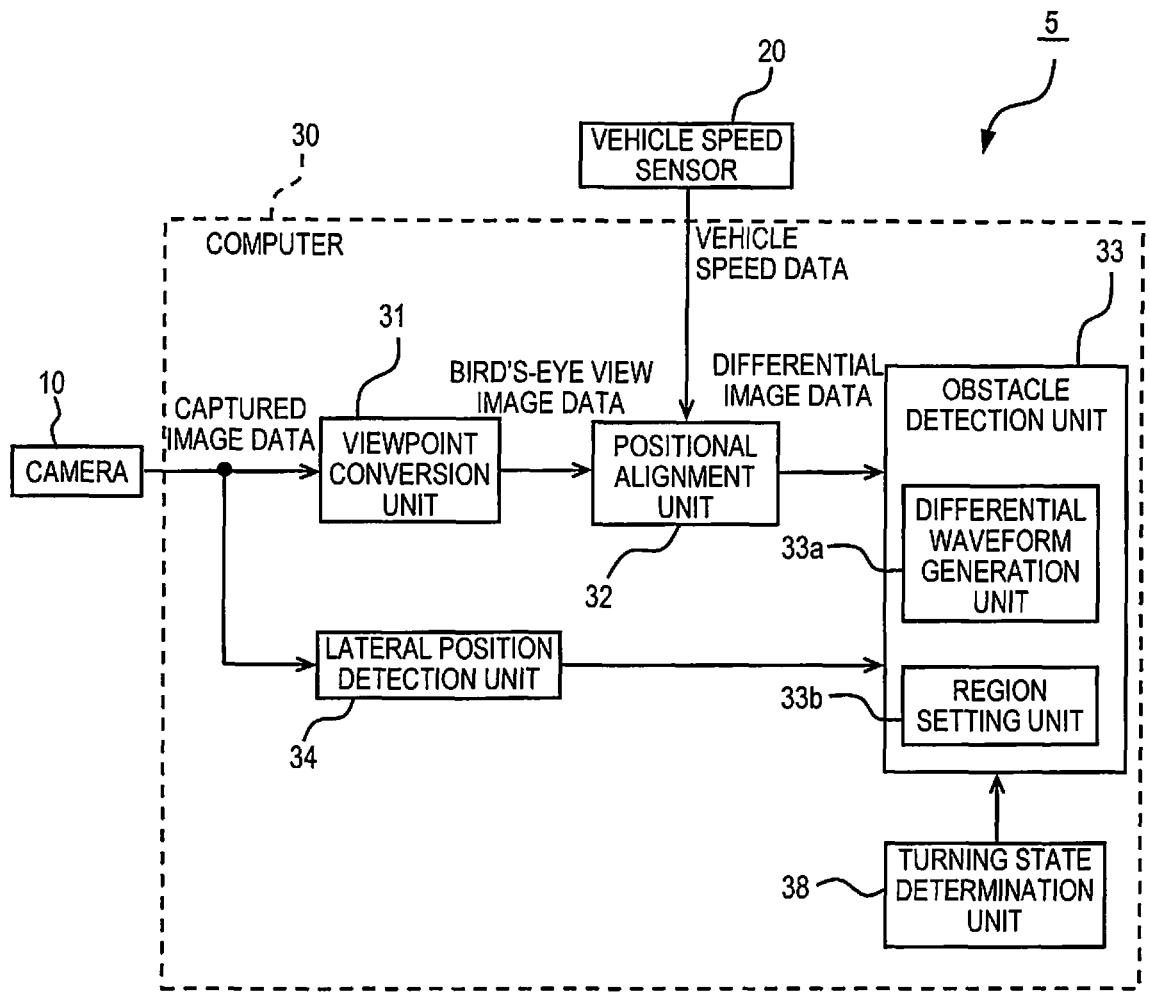
FIG. 24 is a block diagram showing the details of the calculator 30 according to the fifth embodiment.

FIG. 24 is a block diagram showing the details of the calculator 30 according to the fifth embodiment. In FIG. 24, the camera 10 and the vehicle speed sensor 20 are also shown in order to give a clear depiction of the relationship of connection.

The calculator 30 according to the fifth embodiment comprises a turning state determination unit (turning state determination means) 38, as shown in FIG. 24. The turning state determination unit 38 determines whether or not the vehicle V is in a state of turning on the basis of the vehicle speed detected by the vehicle speed sensor 20 or the steering amount detected by a steering angle sensor (not shown), and also detects the turning radius of the vehicle V when the vehicle V is in a state of turning. The method by which the turning state is detected by the turning state determination unit 38 is not particularly limited; the turning state of the vehicle V1 may be detected based on the detection results of a lateral acceleration sensor, for example, or the turning state of the vehicle V1 may be detected by predicting the road shape on the basis of the image captured by the camera 10. The turning state of the vehicle V1 may also be detected by specifying the road on which the vehicle V is traveling in accordance with map information or current position information of the vehicle V according to a navigation system or the like.

The region setting unit 33b according to the fifth embodiment enlarges the detection regions A1, A2 on the basis of the vehicle-widthwise distance Δy between the side surface of the vehicle V and the dividing line, similar to the first embodiment, and in the fifth embodiment, the region setting unit 33b also changes the enlarged amount $\Delta y_0 fs$ when the sizes of the detection regions A1, A2 are enlarged in accordance with the turning radius of the vehicle V, when the vehicle V is determined by the turning state determination unit 38 to be in a state of turning. Specifically, the smaller the turning radius of the vehicle V, the smaller the region setting unit 33b makes the enlarged amount $\Delta y_0 fs$ of the detection regions A1, A2.

Figure 25:
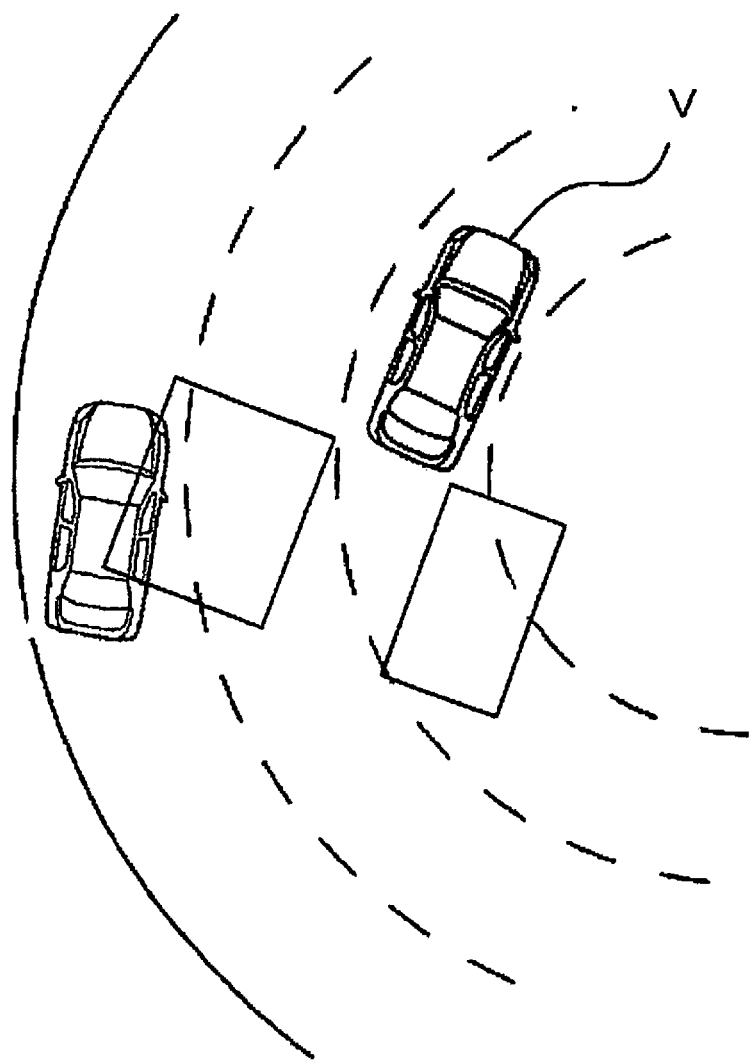
FIG. 25 is a graph showing the relationship between the vehicle-widthwise distance to the dividing line and the size (enlargement amount) of the detection region in the fifth embodiment.

FIG. 25 is a top view showing the traveling state of the vehicle when the vehicle is turning, and also showing an example of a case in which the region setting unit 33b has enlarged the detection region A1. In this scene in which the vehicle V is turning through a curve or the like as shown in FIG. 25, the smaller the turning radius of the vehicle V, the easily the detection regions A1, A2 on the outer sides of the turning direction are set inside the subsequent traffic lanes, and when the detection region A1 is enlarged outward in the vehicle-width direction in the same manner as the first embodiment, there are cases in which another vehicle V in a subsequent traffic lane enters the detection region A1 and this other vehicle V is mistakenly detected as an adjacent vehicle.

Figure 26:
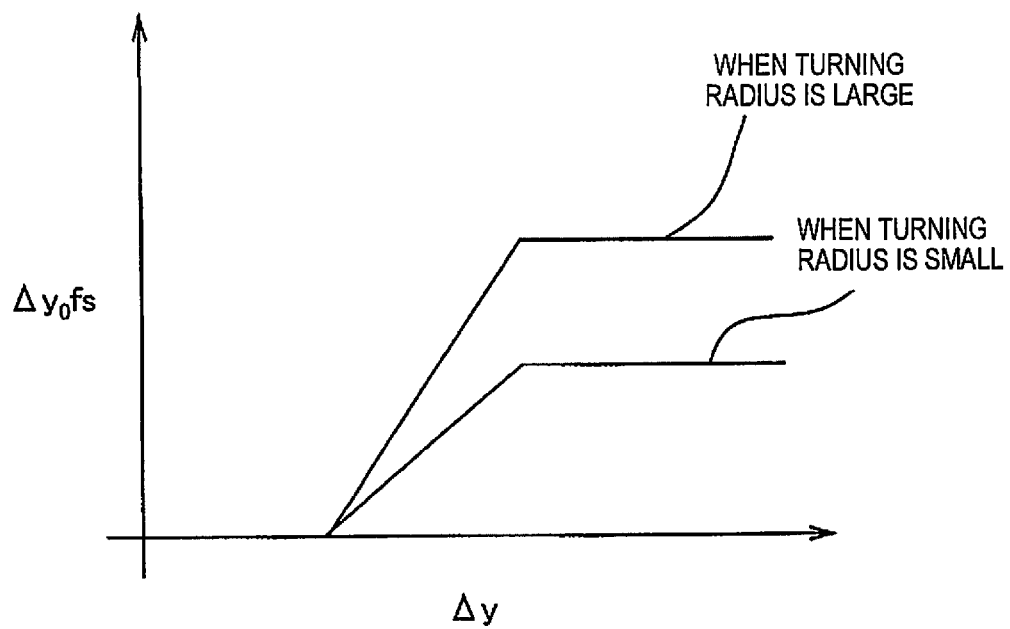
FIG. 26 is a top view showing the traveling state of the vehicle when the vehicle is turning.

In view of this, when the vehicle V is determined by the turning state determination unit 38 to be turning, the smaller the turning radius of the vehicle V, the smaller the region setting unit 33b makes the enlarged amount $\Delta y_0 fs$ of the detection regions A1, A2 relative to the vehicle-widthwise distance Δy, as shown in FIG. 26. It is thereby possible to keep the detection regions A1, A2 from being set in subsequent traffic lanes even when the vehicle V is turning through a curve, and as a result, other vehicles V in subsequent traffic lanes can be effectively prevented from being mistakenly detected as adjacent vehicles.

In addition to the configuration described above, the region setting unit 33b in the fifth embodiment can also employ a configuration for reducing the enlarged amount $\Delta y_0 fs$ of the detection regions A1, A2 on the basis of the traffic lane width of the traffic lane traveled by the vehicle V, as disclosed in the second embodiment. In this case, the region setting unit 33b can compare the enlarged amount $\Delta y_0 fs$ of the detection regions A1, A2 determined based on the turning radius and the enlarged amount $\Delta y_0 fs$ of the detection regions A1, A2 determined based on the traffic lane width, select the smaller enlarged amount $\Delta y_0 fs$, and enlarge the sizes of the detection regions A1, A2 outward in the vehicle-width direction.

Thus, according to the solid object detection device 5 and the solid object detection method according to the fifth embodiment, the precision of detecting solid objects can be improved, and situations such as those that would cause failures to detect solid objects can be (further) prevented, similar to the first embodiment. It is also possible to prevent situations such as those in which the detection regions A1, A2 are extremely contracted, causing detection failures.

In the fifth embodiment, when the vehicle V is determined by the turning state determination unit 38 to be turning, the smaller the turning radius of the vehicle V, the smaller the enlarged amount $\Delta y_0 fs$ of the detection regions A1, A2 relative to the vehicle-widthwise distance Δy as shown in FIG. 26, whereby the detection regions A1, A2 can be kept from being set in subsequent traffic lanes even when the vehicle V is turning through a curve as shown in FIG. 25, and as a result, other vehicles V in subsequent traffic lanes can be effectively prevented from being mistakenly detected as adjacent vehicles.

Furthermore, according to the fifth embodiment, when the vehicle V is changing traffic lanes, the enlarged amount $\Delta y_0 fs$ of the detection regions A1, A2 can be suppressed based on the turning state of the vehicle V. For example, when the vehicle V1 is traveling on a straight road and when the vehicle V is detected to be turning, it can be assessed that the smaller the turning radius, the higher the possibility that the vehicle V is making a traffic lane change. In view of this, by assessing that the smaller the turning radius of the vehicle V, the higher the possibility that the vehicle V is making a traffic lane change, and by reducing the enlarged amount $\Delta y_0 fs$ of the detection regions A1, A2, it is possible to effectively prevent the detection regions A1, A2 from being set in subsequent traffic lanes during a traffic lane change and to prevent other vehicles traveling in subsequent traffic lanes from being mistakenly detected as adjacent vehicles.

Sixth Embodiment

Next, the sixth embodiment of the present invention is described. The solid object detection device and the solid object detection method according to the sixth embodiment are similar to those of the first embodiment, but the configuration and process specifics are partially different. The points of difference with the first embodiment are described below.

Figure 27:
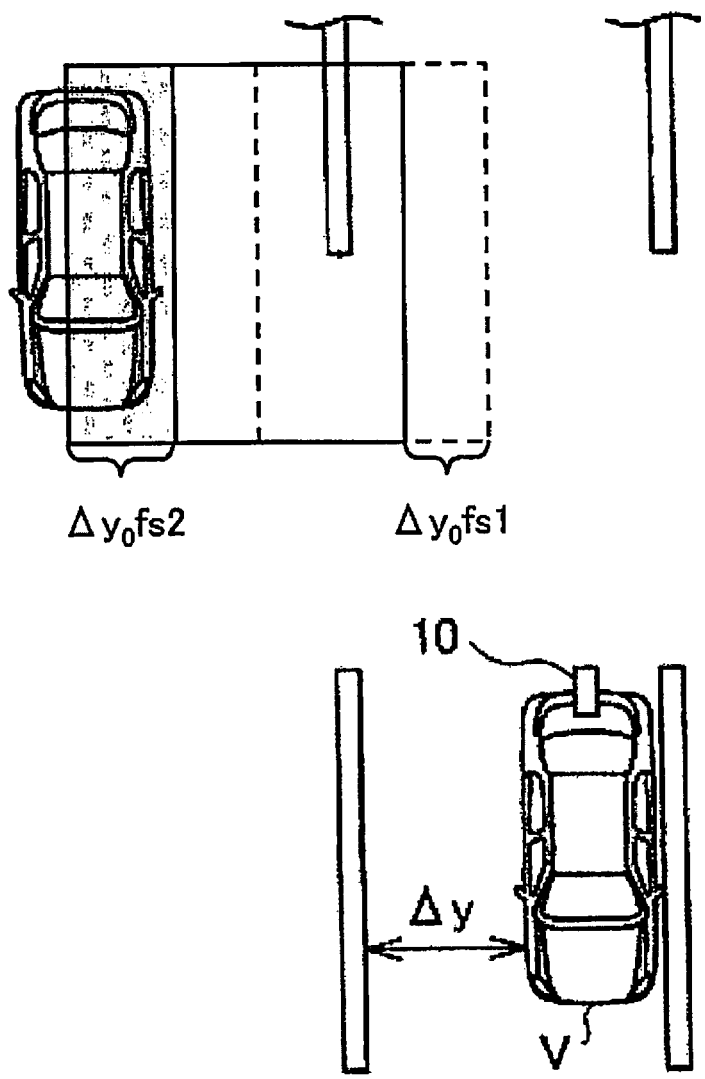
FIG. 27 is a top view showing the traveling state of the vehicle in the sixth embodiment.

FIG. 27 is a top view showing the traveling state of the vehicle in the sixth embodiment, and also showing an example of a case in which the region setting unit 33b has enlarged the detection region A1. In the sixth embodiment, the region setting unit 33b shifts the detection regions A1, A2 outward in the vehicle-width direction on the basis of the vehicle-widthwise distance Δy between the side surface of the vehicle V and the dividing line, and enlarges the detection regions A1, A2 outward in the vehicle-width direction on the basis of the vehicle-widthwise distance Δy between the side surface of the vehicle V and the dividing line. The details are described below.

Figure 28:
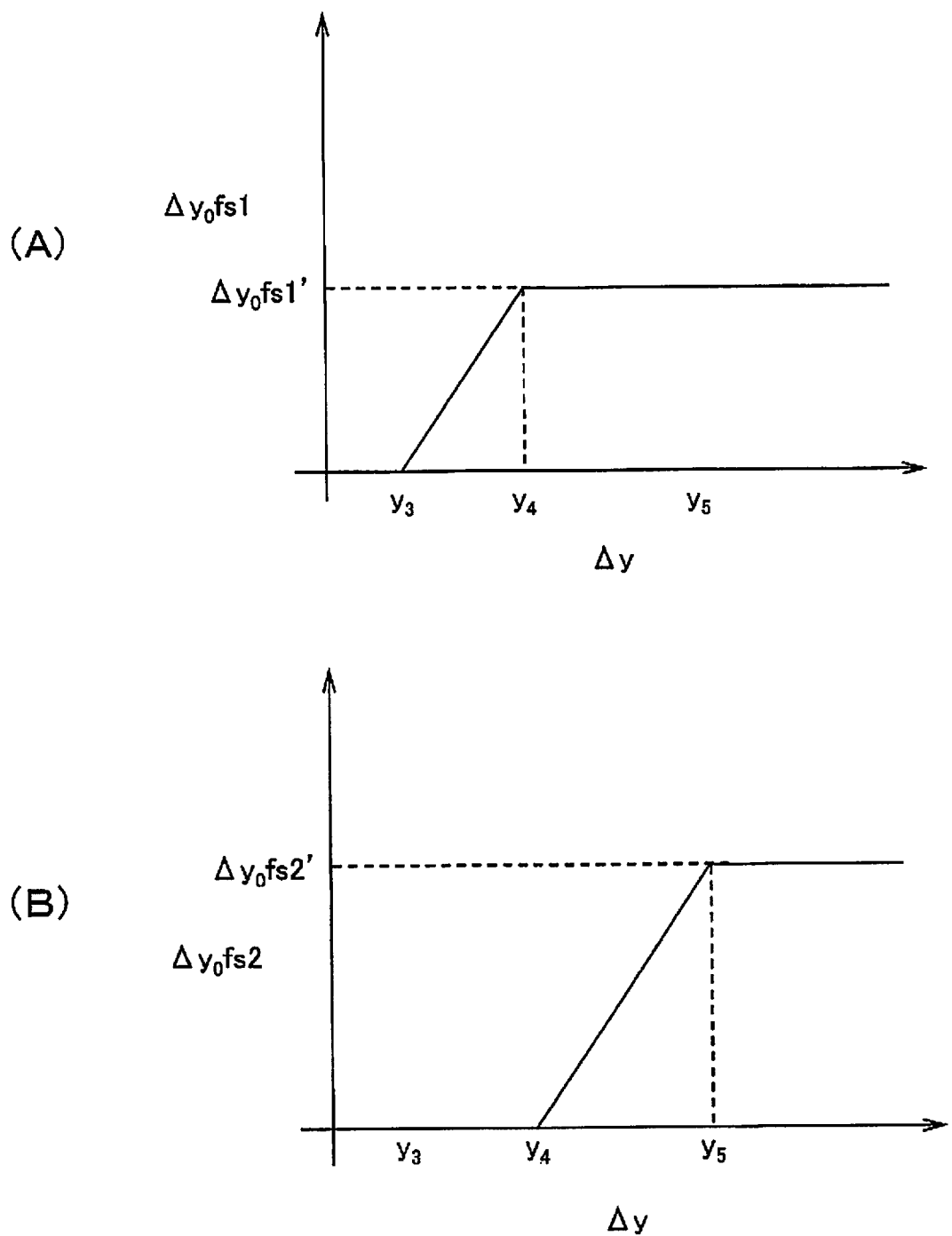
FIG. 28 is a graph showing the relationship between the vehicle-widthwise distance to the dividing line and the size (enlargement amount) of the detection region in the sixth embodiment.

Part (A) of FIG. 28 is a graph showing the relationship between the vehicle-widthwise distance Δy to the dividing line and the movement amount (the shift amount $y_0fs1$) when the detection regions A1, A2 are shifted outward in the vehicle-width direction, and part (B) of FIG. 28 is a graph showing the relationship between the vehicle-widthwise distance Δy to the dividing line and the enlarged amount (the enlarged amount $\Delta y_0fs2$) when the detection regions A1, A2 are enlarged outward in the vehicle-width direction.

Specifically, when the vehicle-widthwise distance Δy between the side surface of the vehicle V and the dividing line is less than $y_3$ as shown in part (A) of FIG. 28, the region setting unit 33b leaves the detection regions A1, A2 unchanged, and when the vehicle-widthwise distance Δy is $y_3$ or greater and less than $y_4$, the region setting unit 33b shifts the detection regions A1, A2 outward in the vehicle-width direction according to the vehicle-widthwise distance Δy. When the vehicle-widthwise distance Δy between the side surface of the vehicle V1 and the dividing line is $y_3$ or greater and less than $y_4$, the detection regions A1, A2 are not enlarged outward in the vehicle-width direction.

When the vehicle-widthwise distance Δy is $y_4$ or greater, the region setting unit 33b shifts the detection regions A1, A2 outward in the vehicle-width direction by a predetermined shift amount $y_0fs1'$ and enlarges the detection regions A1, A2 outward in the vehicle-width direction, as shown in part (A) of FIG. 28. Specifically, when the vehicle-widthwise distance Δy is $y_4$ or greater and less than $y_5$, the detection regions A1, A2 are enlarged outward in the vehicle-width direction according to the vehicle-widthwise distance Δy as shown in part (B) of FIG. 28, and when the vehicle-widthwise distance Δy is $y_5$ or greater, the detection regions A1, A2 are enlarged outward in the vehicle-width direction by a predetermined enlarged amount $\Delta y_0fs2'$.

In a scene in which the vehicle V is separated from the dividing line, for example, the region setting unit 33b thereby shifts the detection regions A1, A2 outward in the vehicle-width direction in accordance with the vehicle-widthwise distance Δy when the vehicle-widthwise distance Δy between the side surface of the vehicle V and the dividing line is $y_3$ or greater, and when the vehicle-widthwise distance Δy thereafter is $y_4$ or greater, the region setting unit 33b stops shifting the detection regions A1, A2 outward in the vehicle-width direction and instead enlarges the detection regions A1, A2 outward in the vehicle-width direction. The region setting unit 33b then enlarges the detection regions A1, A2 outward in the vehicle-width direction in accordance with the vehicle-widthwise distance Δy until the vehicle-widthwise distance Δy reaches $y_5$, and at the point in time when the vehicle-widthwise distance Δy reaches $y_5$, the region setting unit 33b also stops enlarging the detection regions A1, A2 outward in the vehicle-width direction.

In this scene in which the vehicle V approaches the dividing line, when the vehicle-widthwise distance Δy is less than $y_5$, the region setting unit 33b narrows the sizes of the enlarged detection regions A1, A2 inward in the vehicle-width direction. When the vehicle-widthwise distance Δy thereafter is less than $y_4$, the region setting unit 33b stops contracting the detection regions A1, A2 inward in the vehicle-width direction and instead shifts the detection regions A1, A2 inward in the vehicle-width direction in accordance with the vehicle-widthwise distance Δy. When the vehicle-widthwise distance Δy is less than $y_3$, the region setting unit 33b then also stops shifting the detection regions A1, A2 inward in the vehicle-width direction.

Furthermore, in the sixth embodiment, the region setting unit 33b has limit values (enlargement prescribed values, prescribed values) for the amounts of change according to various conditions when the vehicle V is changing traffic lanes, when a solid object is sensed, and during normal times (when the vehicle V is traveling straight and when a solid object is not detected), for both the shift amount $y_0fs1$ and the enlarged amount $\Delta y_0fs2$ of the detection regions A1, A2. The region setting unit 33b then gradually shifts the detection regions A1, A2 outward in the vehicle-width direction within a range that does not exceed the limit values of $\Delta y_0fs1$ and $\Delta y_0fs2$ according to the various conditions, and gradually enlarges the sizes of the detection regions A1, A2 outward in the vehicle-width direction. The limit values for each condition described above are applied regardless of the turning state of the vehicle or the traffic lane width of the traveled lane.

Thus, according to the solid object detection device 6 and the solid object detection method according to the sixth embodiment, the precision of detecting solid objects can be improved, and situations such as those that would cause failures to detect solid objects can be (further) prevented, similar to the first embodiment. It is also possible to prevent situations such as those in which the detection regions A1, A2 are extremely contracted, causing detection failures.

According to the sixth embodiment, the detection regions A1, A2 are shifted outward in the vehicle-width direction on the basis of the vehicle-widthwise distance Δy between the side surface of the vehicle V and the dividing line, and when the vehicle-widthwise distance by thereafter reaches a predetermined value or greater and the shifted amount of the detection regions A1, A2 reaches a predetermined amount, the following effects can be achieved by enlarging the detection regions A1, A2 outward in the vehicle-width direction instead of shifting the detection regions A1, A2.

Specifically, when a solid object (another vehicle or the like) traveling in an adjacent traffic lane is detected in the detection region A1 or A2, the farther outward in the vehicle-width direction the detection region A1 or A2 is positioned, the more of a tendency there is for the movement speed of the solid object to be calculated as being faster than the actual movement speed, and the farther inward in the vehicle-width direction the detection region A1 or A2 is positioned, the more of a tendency there is for the movement speed of the solid object to be calculated as being slower than the actual movement speed. Therefore, when the detection regions A1, A2 are enlarged too far outward in the vehicle-width direction on the basis of the vehicle-widthwise distance Δy, there are cases in which there will be nonuniformity in the movement speed of the detected solid object and the precision of detecting the solid object will decrease, depending on the detected position of the solid object in the detection region A1 or A2. In the present embodiment, when the vehicle V is separated from the dividing line, such nonuniformity in the results of detecting the movement speed of the solid object can be minimized and the solid object (adjacent vehicle) can be appropriately detected by shifting the detection regions A1, A2 outward in the vehicle-width direction on the basis of the vehicle-widthwise distance Δy between the side surface of the vehicle V and the dividing line.

When the detection regions A1, A2 are shifted too far outward in the vehicle-width direction, there are cases in which a two-wheeled vehicle or the like traveling in a position near the vehicle V1 in the vehicle-width direction does not enter the detection region A1 or A2, and this two-wheeled vehicle cannot be detected. However, in the present embodiment, when the shift amount whereby the detection regions A1, A2 are shifted outward in the vehicle-width direction is a predetermined amount or greater, such problems can be effectively resolved by enlarging the detection regions A1, A2 outward in the vehicle-width direction instead of shifting the detection regions A1, A2.

Seventh Embodiment

Next, the seventh embodiment of the present invention is described. The solid object detection device and the solid object detection method according to the seventh embodiment are similar to those of the first embodiment, but the configuration and process specifics are partially different. The points of difference with the first embodiment are described below.

Figure 29:
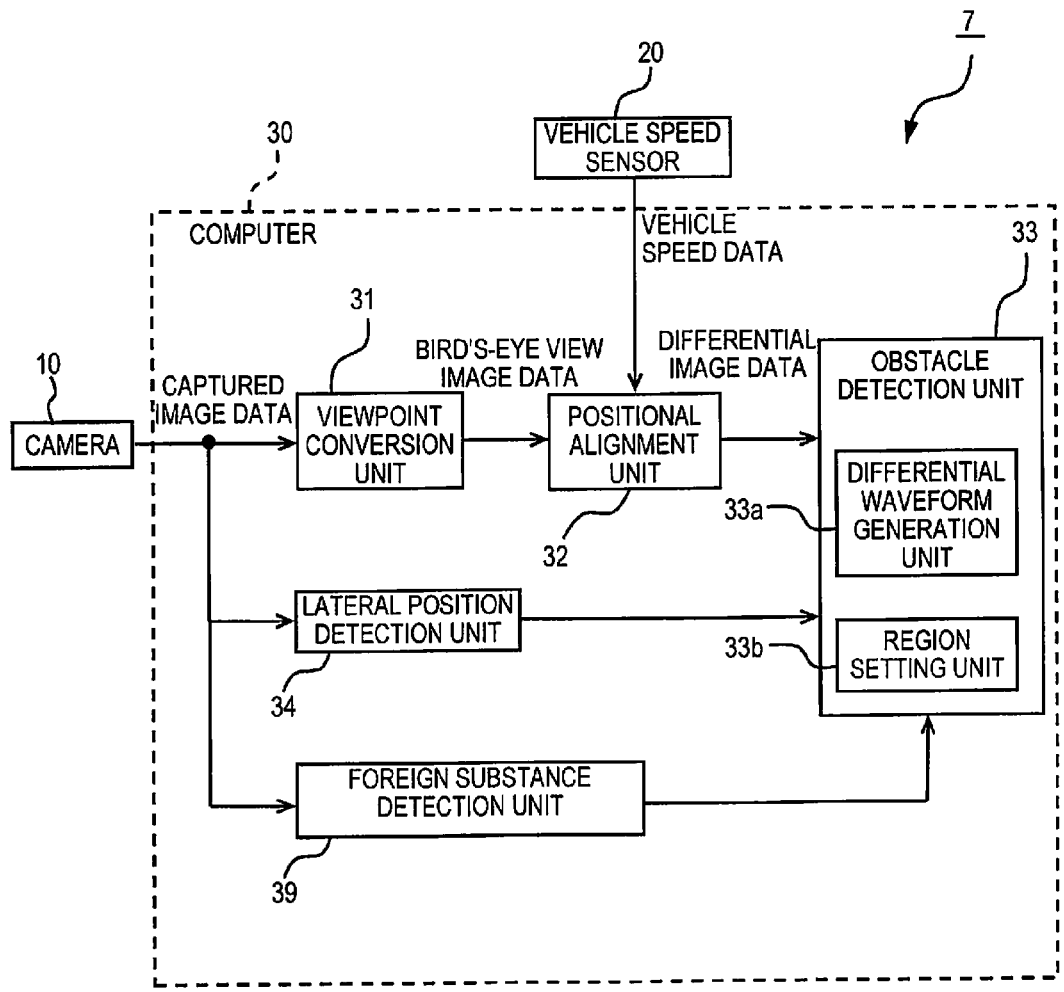
FIG. 29 is a block diagram showing the details of the calculator 30 according to the seventh embodiment.

FIG. 29 is a block diagram showing the details of the calculator 30 according to the seventh embodiment. In FIG. 29, the camera 10 and the vehicle speed sensor 20 are also shown in order to give a clear depiction of the relationship of connection.

The calculator 30 according to the seventh embodiment comprises a foreign substance detection unit (foreign substance detection means) 39, as shown in FIG. 29. Based on the image captured by the camera 10, the foreign substance detection unit 39 detects foreign substances such as rainwater or water stains adhering to the lens. For example, the foreign substance detection unit 39 detects the amount of rainwater adhering to the lens by detecting the operating strength of a wiper or of a rainwater sensor which detects the amount of rainwater adhering to the lens by radiating infrared light onto the lens and detecting the amount by which the radiated infrared light is attenuated by the rainwater; and the foreign substance detection unit 39 outputs the detected amount of rainwater to the region setting unit 33*b*.

The foreign substance detection unit 39 is not limited to detecting rainwater, and may, for example, also detect water stains or mud adhering to the lens. For example, by extracting the edge of a photographed subject from the captured image and assessing the sharpness of the image from the characteristics of the extracted edge, the foreign substance detection unit 39 may assess the extent to which water stains or the like are adhering to the lens and the lens is clouded (a white thin film is formed on the lens surface), and may thereby detect the amount of foreign substances adhering to the lens. Otherwise, when an edge of similar intensity is detected in the same region in the captured image over a certain time duration, the foreign substance detection unit 39 may assess that foreign substances are adhering to this region and detect the amount of foreign substances adhering to the lens.

The region setting unit 33*b* according to the seventh embodiment enlarges the detection regions A1, A2 outward in the vehicle-width direction on the basis of the vehicle-widthwise distance $\Delta y$ between the side surface of the vehicle V and the dividing line similar to the first embodiment, and in the seventh embodiment also varies the enlarged amount $\Delta y_0 fs$ when enlarging the detection regions A1, A2 on the basis of the amount of foreign substances detected by the foreign substance detection unit 39. Specifically, the greater the amount of foreign substances adhering to the lens, the smaller the region setting unit 33*b* makes the enlarged amount $\Delta y_0 fs$ when enlarging the detection regions A1, A2.

Figure 30:
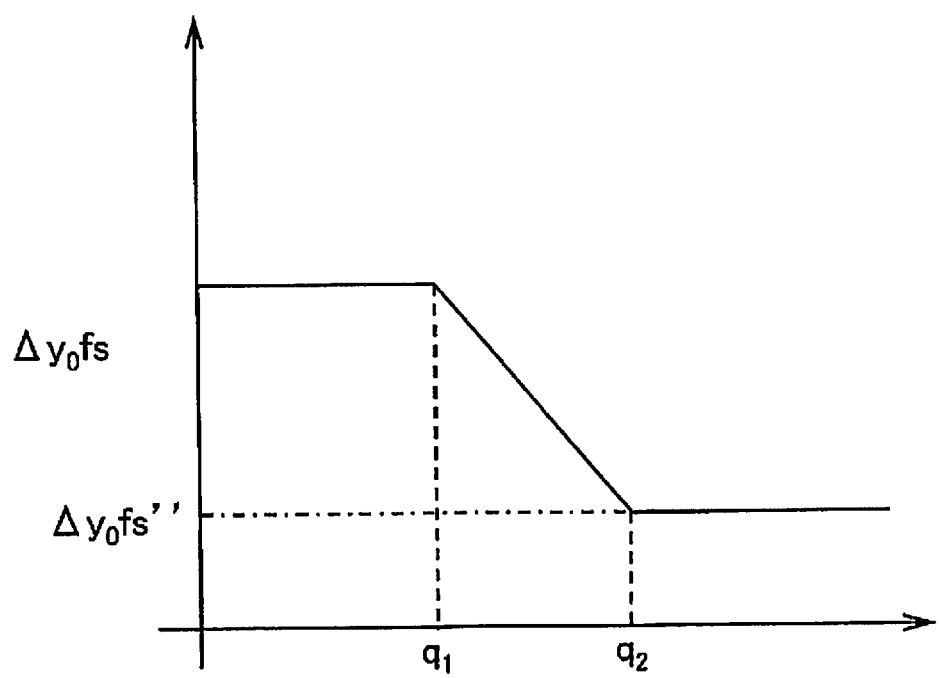
FIG. 30 is a graph showing the relationship between the vehicle-widthwise distance to the dividing line and the size (enlargement amount) of the detection region in the seventh embodiment.

FIG. 30 is a graph showing the relationship between the amount of foreign substances adhering to the lens and the sizes of the detection regions A1, A2 (the enlarged amount $\Delta y_0 fs$). The greater the amount of foreign substances adhering to the lens, the smaller the region setting unit 33*b* makes the enlarged amount $\Delta y_0 fs$ when enlarging the detection regions A1, A2 as shown in FIG. 30. Specifically, when the amount of foreign substances adhering to the lens is less than $q_1$, the region setting unit 33*b* keeps the enlarged amount $\Delta y_0 fs$ of the detection regions A1, A2 at the initial enlarged amount determined based on the vehicle-widthwise distance $\Delta y$. When the amount of foreign substances adhering to the lens is $q_1$ or greater and less than $q_2$, the greater the amount of foreign substances adhering to the lens, the smaller the region setting unit 33*b* makes the enlarged amount $\Delta y_0 fs$ of the detection regions A1, A2. When the amount of foreign substances adhering to the lens exceeds $q_2$, the region setting unit 33*b* sets the enlarged amount of the detection regions A1, A2 to the smallest predetermined value $\Delta y_0 fs''$.

Thus, according to the solid object detection device 7 and the solid object detection method according to the seventh embodiment, the precision of detecting solid objects can be improved, and situations such as those that would cause failures to detect solid objects can be (further) prevented, similar to the first embodiment. It is also possible to prevent situations such as those in which the detection regions A1, A2 are extremely contracted, causing detection failures.

According to the seventh embodiment, the amount of foreign substances adhering to the lens of the camera 10 are detected, and the greater the amount of foreign substances, the smaller the enlarged amount $\Delta y_0 fs$ of the detection regions A1, A2. The greater the amount of foreign substances adhering to the lens, the more of the luminous flux from the photographed subject is blocked and irregularly reflected by the foreign substances, and as a result, there are cases in which the image of the dividing line captured by the camera 10 is distorted or fogged, and the precision of detecting the dividing line is reduced. Therefore, in the present embodiment, when a large amount of foreign substances has adhered to the lens, the enlarged amount $\Delta y_0 fs$ of the detection regions A1, A2 is reduced, whereby it is possible to effectively prevent the enlarged amount of the detection regions A1, A2 from being too large due to an error in detecting the vehicle-widthwise distance $\Delta y$ between the side surface of the vehicle V and the dividing line, and to effectively prevent other vehicles traveling in subsequent traffic lanes, grass outside of the road, and the like from being mistakenly detected as adjacent vehicles.

Eighth Embodiment

Next, the eighth embodiment of the present invention is described. The solid object detection device and the solid object detection method according to the eighth embodiment are similar to those of the first embodiment, but the configuration and process specifics are partially different. The points of difference with the first embodiment are described below.

Figure 31:
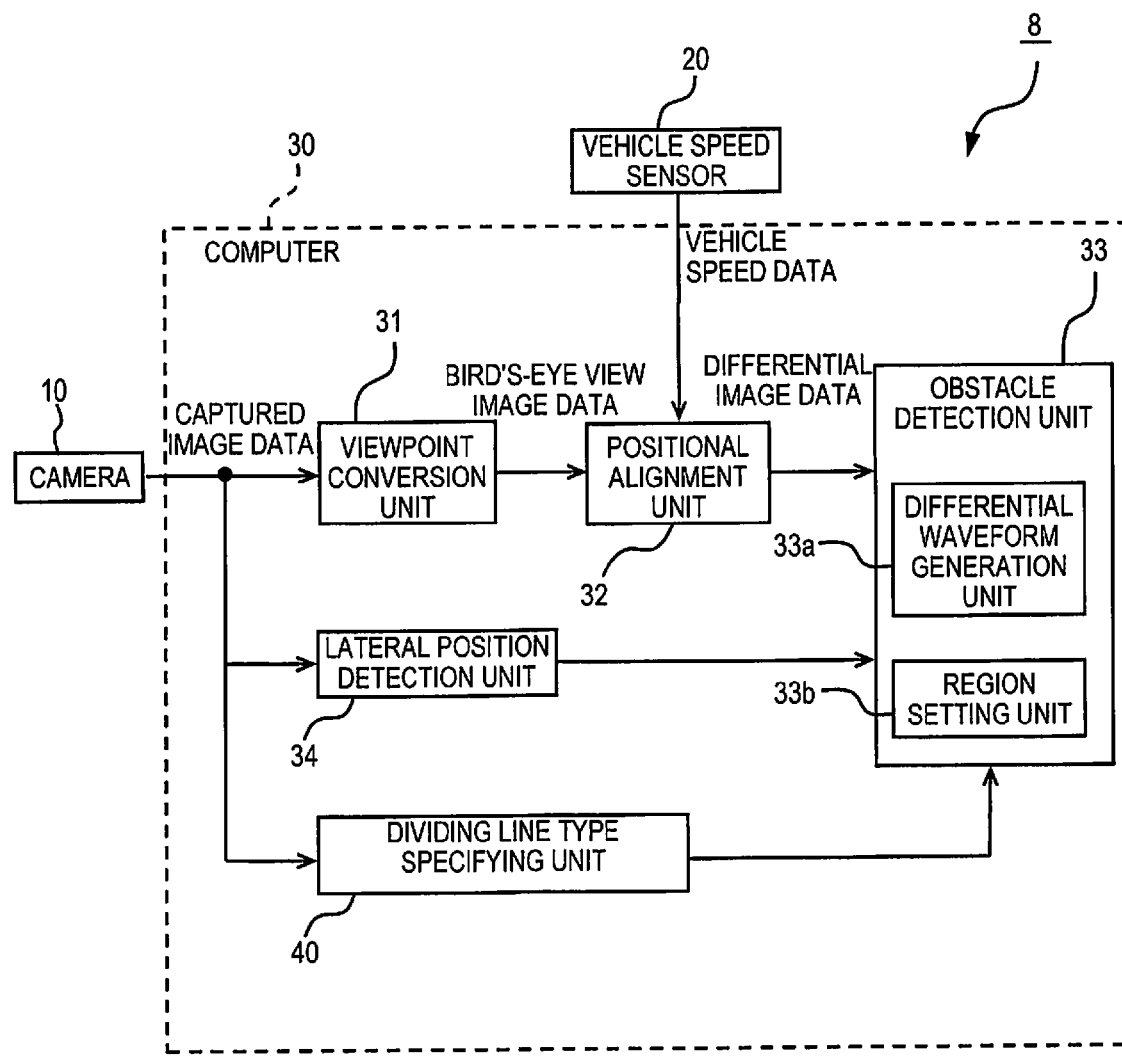
FIG. 31 is a block diagram showing the details of the calculator 30 according to the eighth embodiment.

FIG. 31 is a block diagram showing the details of the calculator 30 according to the eighth embodiment. In FIG. 31, the camera 10 and the vehicle speed sensor 20 are also shown in order to give a clear depiction of the relationship of connection.

The calculator 30 according to the eighth embodiment comprises a dividing line type specifying unit (dividing line type specifying means) 40, as shown in FIG. 31. The dividing line type specifying unit 40 specifies the type of dividing line on the basis of the image captured by the camera 10. The method for specifying the type of dividing line is not particularly limited, but the dividing line type specifying unit 40 can, for example, specify the type of dividing line by performing pattern matching on the dividing line imaged by the camera 10. Otherwise, the dividing line type specifying unit 40 can specify the type of dividing line from map information by specifying the road (traffic lane) on which the vehicle V is traveling, in accordance with map information or the current position information of the vehicle V in a navigation system or the like.

The region setting unit 33b according to the eighth embodiment enlarges the detection regions A1, A2 outward in the vehicle-width direction on the basis of the vehicle-widthwise distance $\Delta y$ between the side surface of the vehicle V and the dividing line similar to the first embodiment, and in the eighth embodiment, the region setting unit 33b also varies the enlarged amount $\Delta y_0 fs$ when enlarging the detection regions A1, A2 on the basis of the type of dividing line specified by the dividing line type specifying unit 40.

Figure 32:
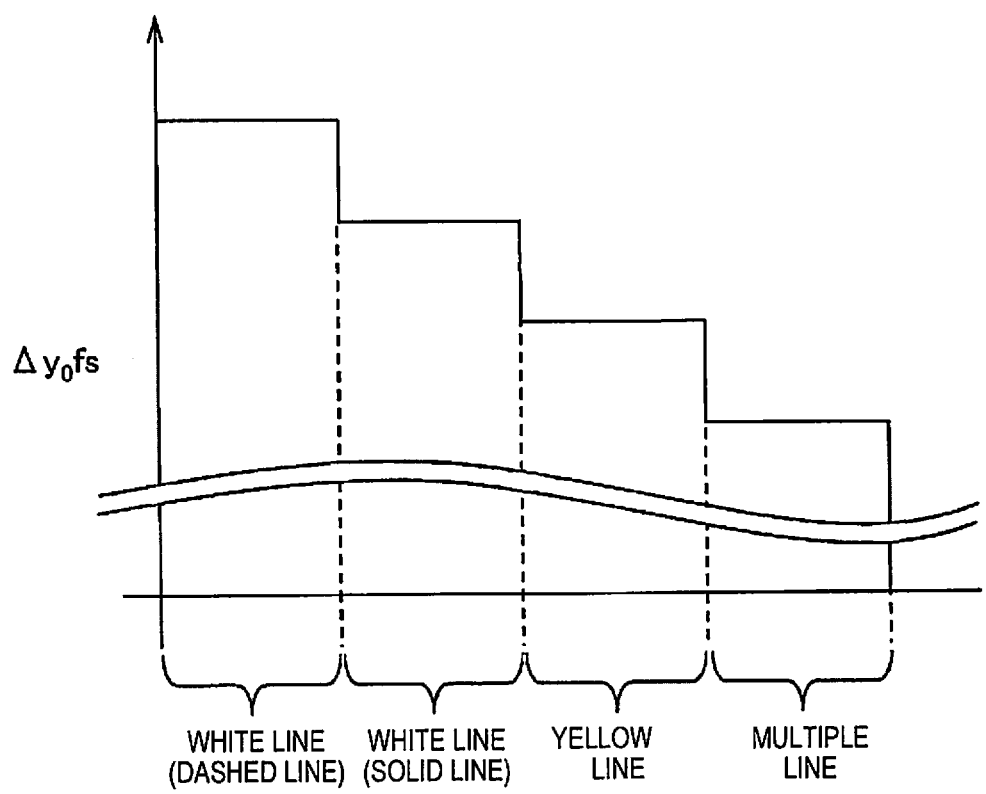
FIG. 32 is a diagram for describing the relationship between the type of dividing line and the size (enlarged amount) of the detection regions A1, A2.

FIG. 32 is a diagram showing the relationship between the type of dividing line and the size of the detection regions A1, A2. The lower the possibility that the specified dividing line is a dividing line that divides the lane traveled by the vehicle V and an adjacent traffic lane, the smaller the region setting unit 33b makes the enlarged amount $\Delta y_0 fs$ of the detection regions A1, A2. In the example shown in FIG. 32, for example, the region setting unit 33b is capable of specifying four types of dividing lines: a white dashed line, a white solid line, a yellow line, and a multiple line. In this case, when the dividing line is a white dashed line, the region setting unit 33b assesses from these four types of dividing lines that the possibility is highest that the region adjacent to the lane traveled by the vehicle V is an adjacent traffic lane, and increases the enlarged amount $\Delta y_0 fs$ of the detection regions A1, A2 by the greatest amount among these four types of dividing lines. When the dividing line is a solid white line, the region setting unit 33b assesses that there is a possibility that the region next to the lane traveled by the vehicle V is an adjacent traffic lane, and sets the enlarged amount $\Delta y_0 fs$ of the detection regions A1, A2 so that the enlarged amount $\Delta y_0 fs$ is smaller than that of the white dashed line but larger than that of other dividing lines. When the dividing line is a yellow line, the region setting unit 33b assesses that the possibility is low that the region next to the lane traveled by the vehicle V is an adjacent traffic lane, and reduces the enlarged amount $\Delta y_0 fs$ of the detection regions A1, A2. When the dividing line is a multiple line, the region setting unit 33b assesses that the possibility is lowest that the region next to the lane traveled by the vehicle V is an adjacent traffic lane, and reduces the enlarged amount $\Delta y_0 fs$ of the detection regions A1, A2 by the greatest amount among these four types of dividing lines.

Thus, according to the solid object detection device 8 and the solid object detection method according to the eighth embodiment, the precision of detecting solid objects can be improved, and situations such as those that would cause failures to detect solid objects can be (further) prevented, similar to the first embodiment. It is also possible to prevent situations such as those in which the detection regions A1, A2 are extremely contracted, causing detection failures.

According to the eighth embodiment, the type of dividing line is specified, and a different enlarged amount $\Delta y_0 fs$ of the detection regions A1, A2 is used based on the specified type of dividing line. For example, when the type of dividing line is a yellow line or a multiple line, it is possible that the region next to the lane traveled by the vehicle V is the shoulder, outside of the road, or an oncoming traffic lane, in which case there is a greater possibility that grass, noise, or the like outside of the road will be detected when the detection regions A1, A2 are enlarged, and the precision of detecting solid objects (other vehicles and the like) decreases. In the present embodiment, when the type of dividing line is a yellow line or a multiple line, for example, detection of grass, noise, or the like outside of the road can be effectively suppressed by suppressing the enlarging of the detection regions A1, A2. When the type of dividing line is a dashed white line or a solid white line, the region next to the lane traveled by the vehicle V is possibly an adjacent traffic lane, in which case a solid object (another vehicle V) in the adjacent traffic lane can be appropriately detected by appropriately enlarging the detection regions A1, A2 in accordance with the vehicle-widthwise distance $\Delta y$.

The present invention was described above based on embodiments, but the present invention is not limited to the above embodiments, and alterations may be added and the embodiments may be combined within a range that does not deviate from the scope of the present invention.

For example, in the third embodiment described above, a configuration was exemplified in which the enlarged amount $\Delta y_0 fs$ when enlarging the sizes of the detection regions A1, A2 was reduced for a certain time duration in cases in which a traffic lane change made by the vehicle V was detected by the traffic lane change detection unit 36, but a possible addition to this configuration is one in which the movement speed of the vehicle V in the vehicle-width direction is calculated when a traffic lane change made by the vehicle V is detected, and the higher the movement speed of the vehicle V in the vehicle-width direction, the smaller the enlarged amount $\Delta y_0 fs$ when enlarging the sizes of the detection regions A1, A2. In this case, the higher the movement speed of the vehicle V in the vehicle-width direction, the higher of a possibility of the vehicle V changing traffic lanes that can be assessed. Therefore, by making the enlarged amount $\Delta y_0 fs$ of the detection regions A1, A2 smaller the higher the movement speed of the vehicle V in the vehicle-width direction, it is possible to effectively prevent the detection regions A1, A2 from being enlarged by too much and the detection regions A1, A2 from being set in subsequent traffic lanes due to the vehicle V changing traffic lanes. The method for calculating the movement speed of the vehicle V in the vehicle-width direction is not particularly limited, and the region setting unit 33b can calculate the movement speed of the vehicle V in the vehicle-width direction, either based on the change over time in the vehicle-widthwise distance $\Delta y$ from the side surface of the vehicle V to the dividing line as detected by the lateral position detection unit 34, or by using a lateral acceleration sensor (not shown).

In the sixth embodiment described above, a configuration was exemplified in which after the detection regions A1, A2 are shifted outward in the vehicle-width direction on the basis of the vehicle-widthwise distance $\Delta y$ from the side surface of the vehicle V to the dividing line, the sizes of the detection regions A1, A2 are enlarged outward in the vehicle-width direction, but the configuration is not limited as such, and another possible option is that the sizes of the detection regions A1, A2 be enlarged outward in the vehicle-width direction while the detection regions A1, A2 are simultaneously shifted outward in the vehicle-width direction, for example.

Furthermore, in the embodiments described above, the speed of the vehicle V is assessed based on a signal from the vehicle speed sensor 20, but assessing the vehicle speed is not limited as such, and the vehicle speed may be estimated from a plurality of images of different times. In this case, the vehicle speed sensor is unnecessary, and the configuration can be simplified. The vehicle behavior may also be assessed solely from images.

Additionally, in the above embodiments a captured image of the current time and an image of one time prior are converted to overhead views, a differential image $PD_t$ is generated upon combining the converted overhead views, and the generated differential image $PD_t$ is evaluated along the falling direction (the direction in which the solid object falls when the captured images are converted to overhead views) to generate a differential waveform $DW_t$, but the present invention is not limited as such. In another possible option, for example, only the image of one time prior is converted to an overhead view, the converted overhead view is converted to an equivalent of the captured image after being positionally aligned, a differential image is generated from this image and an image of the current time, and a differential waveform $DW_t$ is generated by evaluating the generated differential image along a direction equivalent to the falling direction (i.e., a direction obtained by converting the falling direction to a direction on the captured image). Specifically, if the image of the current time and the image of the one time prior are positionally aligned, a differential image $PD_t$ is generated from the differential of the two positionally aligned images, and the differential image $PD_t$ can be evaluated along the falling direction of the solid object when the image is converted to an overhead view; it is not absolutely necessary to generate an overhead view.

The solid object detection devices 1 to 3 according to the present embodiments detect a solid object on the basis of the differential waveform $DW_t$, but are not limited as such, and may, for example, detect a solid object by using an optical flow or an image template. Furthermore, detecting the solid object is limited to using the differential waveform $DW_t$, and the differential image $PD_t$ may be used. Furthermore, when the sizes of the detection regions A1, A2 are enlarged, the sizes of the detection regions A1, A2 themselves are changed in the present embodiment, but the present invention is not limited as such and enlargement areas separate from the detection regions A1, A2 may be set.

Furthermore, the positional alignment unit 32 in the present embodiment positionally aligns the positions of overhead view images of different times in an overhead view, but this "positionally aligning" process can be performed with a precision corresponding to the type of detection objective or the required detection precision. For example, strict positional alignment may be performed based on the same time or the same position, or lax positional alignment may be performed only enough to perceive coordinates of the overhead view images.

The invention claimed is:

1. A solid object detection device for detecting a solid object traveling in an adjacent traffic lane that is adjacent across a dividing line serving as a boundary to a traffic lane traveled by a vehicle, the solid object detection device comprising:
   an image-capturing unit configured to be installed for capturing an image including the dividing line and a predetermined region of the adjacent traffic lane, the image-capturing unit being installed in the vehicle;
   a solid object assessment unit programmed to assess whether or not a solid object is present in the predetermined region image captured by the image-capturing unit;
   a lateral position detection unit that detects a vehicle-widthwise distance between the dividing line and a vehicle position in the lane traveled by the vehicle from the image captured by the image-capturing unit;
   a region setting unit programmed to enlarge a size of the predetermined region that is positioned on the side where the dividing line is located farther outward in the vehicle-width direction in accordance with an increase in the vehicle-widthwise distance to the dividing line detected by the lateral position detection unit; and
   a traffic lane change detection unit that detects an existence of a traffic lane change made by the vehicle;
   the amount by which the size of the predetermined region is enlarged outward in the vehicle-width direction being reduced by the region setting unit when a traffic lane change made by the vehicle is detected by the traffic lane change detection unit.

2. The solid object detection device according to claim 1, wherein
   the region setting unit calculates a movement speed of the vehicle in the vehicle-width direction when a traffic lane change made by the vehicle is detected by the traffic lane change detection unit; and causes the amount by which the size of the predetermined region is enlarged outward in the vehicle-width direction to be reduced correspondingly with respect to the increase in movement speed in the vehicle-width direction.

3. The solid object detection device according to claim 1, further comprising
   a width detection unit for detecting the traffic lane width of the lane traveled by the vehicle or the adjacent traffic lane;
   the amount by which the size of the predetermined region is enlarged outward in the vehicle-width direction being reduced by the region setting unit in accordance with a decrease in the traffic lane width detected by the width detection unit.

4. The solid object detection device according to claim 1, wherein
   the region setting unit enlarges the predetermined region in increments of a predetermined enlargement prescribed value through multiple iterations of a process when enlarging the size of the predetermined region, and the region setting unit contracts the predetermined region inward in the vehicle-width direction in increments of a prescribed value less than the enlargement prescribed value through multiple iterations of a process when returning the size of the predetermined region to an original size.

5. The solid object detection device according to claim 1, wherein
   the region setting unit causes the prescribed value to be lower when a solid object is being detected than when a solid object is not being detected.

6. The solid object detection device according to claim 1, further comprising
   a ground line detection unit configured to detect a ground line of a solid object traveling in the adjacent traffic lane;
   the region setting unit reduces the amount by which the size of the predetermined region is enlarged outward in the vehicle-width direction in accordance with a decrease in distance in the vehicle-width direction from the vehicle to the ground line.

7. The solid object detection device according to claim 1, further comprising
   a turning state determination unit configured to detect a turning state of the vehicle;
   the region setting unit reduces the amount by which the size of the predetermined region is enlarged outward in the vehicle-width direction in accordance with a decrease in a turning radius of the vehicle detected by the turning state determination unit.

8. The solid object detection device according to claim 1, wherein the region setting unit moves the predetermined region outward in the vehicle-width direction and enlarges the size of the predetermined region outward in the vehicle-width direction when the vehicle-widthwise distance is a predetermined value or greater.

9. The solid object detection device according to claim 1, wherein the region setting unit enlarges the size of the predetermined region outward in the vehicle-width direction after moving the predetermined region outward in the vehicle-width direction.

10. The solid object detection device according to claim 1, further comprising a foreign substance detection unit configured to detect foreign substances adhering to a lens of the image-capturing unit;

the region setting unit reduces the amount by which the size of the predetermined region is enlarged outward in the vehicle-width direction in accordance with an increase in an amount of foreign substances detected by the foreign substance detection unit.

11. The solid object detection device according to claim 1, further comprising a dividing line type specifying unit configured to specify a type of dividing line;

the region setting unit varies the amount by which the size of the predetermined region is enlarged outward in the vehicle-width direction based on the type of dividing line specified by the dividing line type specifying unit.

12. A solid object detection method for detecting a solid object traveling in an adjacent traffic lane that is adjacent across a dividing line serving as a boundary to the traffic lane traveled by a vehicle, the solid object detection method comprising:

capturing an image including the dividing line and a predetermined region of the adjacent traffic lane from the vehicle;

assessing whether or not a solid object is present in the predetermined region image captured by the image-capturing unit;

detecting a vehicle-widthwise distance between the dividing line and a vehicle position in the lane traveled by the vehicle from the image obtained;

detecting an existence of a traffic lane change made by the vehicle; and enlarging a size of the predetermined region outward in the vehicle-width direction such that an amount of enlargement increases in accordance with an increase in the vehicle-widthwise distance to the dividing line that was detected, the predetermined region being positioned on the side where the dividing line is located; and reducing the amount of enlargement outward in the vehicle-width direction when a traffic lane change made by the vehicle is detected.

* * * * *